United States Patent
Eriksson et al.

(10) Patent No.: US 9,709,283 B2
(45) Date of Patent: Jul. 18, 2017

(54) USER INTERFACE FOR WHITE GOODS AND ASSOCIATED MULTI-CHANNEL PROXIMITY SENSORS

(71) Applicant: Neonode Inc., Santa Clara, CA (US)

(72) Inventors: Thomas Eriksson, Stockholm (SE); Stefan Holmgren, Sollentuna (SE); Carl Richard Henriksson, Stockholm (SE); Stefan Östergårde, Skarpnäck (SE)

(73) Assignee: Neonode Inc., San Jose, CA (US)

( * ) Notice: Subject to any disclaimer, the term of this patent is extended or adjusted under 35 U.S.C. 154(b) by 0 days.

(21) Appl. No.: 14/611,281

(22) Filed: Feb. 2, 2015

(65) Prior Publication Data

US 2015/0153050 A1    Jun. 4, 2015

Related U.S. Application Data

(63) Continuation of application No. 14/229,913, filed on Mar. 29, 2014, now Pat. No. 8,976,158, which is a
(Continued)

(51) Int. Cl.
*F24C 7/08* (2006.01)
*G06F 3/042* (2006.01)
(Continued)

(52) U.S. Cl.
CPC .............. *F24C 7/086* (2013.01); *F24C 7/083* (2013.01); *G06F 1/169* (2013.01); *G06F 3/0421* (2013.01);
(Continued)

(58) Field of Classification Search
CPC ........ G06F 3/017; G06F 3/042; G06F 3/0421; G06F 3/011
(Continued)

(56) References Cited

U.S. PATENT DOCUMENTS

| | | |
|---|---|---|
| 4,332,468 A | 6/1982 | Stützle |
| 4,479,053 A | 10/1984 | Johnston |

(Continued)

FOREIGN PATENT DOCUMENTS

| | | |
|---|---|---|
| EP | 2189727 A1 | 5/2010 |
| JP | 10-148640 A | 6/1998 |

(Continued)

OTHER PUBLICATIONS

PCT Patent Application No. PCT/US2014/032109, Search Report and Written Opinion, Oct. 14, 2014, 27 pages.
(Continued)

*Primary Examiner* — Anne M Antonucci
(74) *Attorney, Agent, or Firm* — Soquel Group LLC

(57) ABSTRACT

A method for operating a stove including providing a plurality of burners beneath a cooktop surface and a plurality of visible-light emitters mounted under the surface for separately, variably illuminating edges of the surface adjacent to each of the burners, providing a touch-and-proximity sensor for detecting objects above the surface, illuminating at least one edge of the surface in response to the sensor detecting a pot suspended above one of the burners, and intensifying the illuminating commensurate with proximity of the pot to the one burner, as further detected by the sensor.

12 Claims, 76 Drawing Sheets

Related U.S. Application Data continuation-in-part of application No. 14/140,635, filed on Dec. 26, 2013, now Pat. No. 9,001,087, which is a continuation of application No. 13/732,456, filed on Jan. 2, 2013, now Pat. No. 8,643,628, said application No. 14/229,913 is a continuation of application No. 14/088,458, filed on Nov. 25, 2013, now Pat. No. 8,775,023, which is a continuation of application No. 13/854,074, filed on Mar. 30, 2013, now Pat. No. 8,810,551, which is a continuation of application No. 13/424,592, filed on Mar. 20, 2012, now Pat. No. 8,416,217, which is a continuation-in-part of application No. 12/760,568, filed on Apr. 15, 2010, now abandoned, which is a continuation-in-part of application No. 12/371,609, filed on Feb. 15, 2009, now Pat. No. 8,339,379, said application No. 14/088,458 is a continuation-in-part of application No. 13/775,269, filed on Feb. 25, 2013, now Pat. No. 8,917,239, and a continuation-in-part of application No. 13/424,543, filed on Mar. 20, 2012, now Pat. No. 9,052,777, which is a continuation-in-part of application No. 12/760,567, filed on Apr. 15, 2010, now Pat. No. 9,213,443, and a continuation-in-part of application No. PCT/US2011/029191, filed on Mar. 21, 2011.

(60) Provisional application No. 61/806,414, filed on Mar. 29, 2013, provisional application No. 61/713,546, filed on Oct. 14, 2012, provisional application No. 61/730,139, filed on Nov. 27, 2012, provisional application No. 61/564,868, filed on Nov. 30, 2011, provisional application No. 61/169,779, filed on Apr. 16, 2009, provisional application No. 61/564,164, filed on Nov. 28, 2011, provisional application No. 61/379,012, filed on Sep. 1, 2010, provisional application No. 61/380,600, filed on Sep. 7, 2010, provisional application No. 61/410,930, filed on Nov. 7, 2010.

(51) Int. Cl.
*G06F 1/16* (2006.01)
*G06F 3/0488* (2013.01)

(52) U.S. Cl.
CPC ........ *G06F 3/0428* (2013.01); *G06F 3/04883* (2013.01)

(58) Field of Classification Search
USPC .......................................................... 345/175
See application file for complete search history.

(56) References Cited

U.S. PATENT DOCUMENTS

| | | |
|---|---|---|
| 4,564,756 A | 1/1986 | Johnson |
| 4,847,606 A | 7/1989 | Beiswenger |
| 4,893,025 A | 1/1990 | Lee |
| 5,658,478 A | 8/1997 | Roeschel et al. |
| 6,722,142 B1 | 4/2004 | Pagel |
| 6,972,753 B1 | 12/2005 | Kimura et al. |
| 7,355,164 B2 | 4/2008 | Arnold |
| 8,169,404 B1 | 5/2012 | Boillot |
| 8,316,324 B2 | 11/2012 | Boillot |
| 9,050,943 B2 | 6/2015 | Müller |
| 2003/0010043 A1 | 1/2003 | Ferragut, II |
| 2005/0029245 A1 | 2/2005 | Gerola et al. |
| 2005/0052426 A1 | 3/2005 | Hagermoser et al. |
| 2005/0252754 A1 | 11/2005 | Arnold |
| 2006/0010890 A1 | 1/2006 | Feinauer et al. |
| 2006/0028455 A1 | 2/2006 | Hinckley et al. |
| 2006/0038793 A1 | 2/2006 | Philipp |
| 2007/0228263 A1 | 10/2007 | Shen et al. |
| 2008/0236563 A1 | 10/2008 | Wilsdorf |
| 2008/0266272 A1 | 10/2008 | Narayan et al. |
| 2008/0297487 A1 | 12/2008 | Hotelling et al. |
| 2009/0039068 A1 | 2/2009 | Boutwell |
| 2009/0096994 A1 | 4/2009 | Smits |
| 2009/0173730 A1 | 7/2009 | Baier et al. |
| 2010/0147602 A1 | 6/2010 | Jung et al. |
| 2010/0182136 A1 | 7/2010 | Pryor |
| 2010/0214270 A1 | 8/2010 | Lai et al. |
| 2011/0169773 A1 | 7/2011 | Luo |
| 2011/0253693 A1 | 10/2011 | Lyons et al. |
| 2011/0309912 A1 | 12/2011 | Muller |
| 2013/0263633 A1 | 10/2013 | Minter et al. |

FOREIGN PATENT DOCUMENTS

| | | |
|---|---|---|
| WO | 9615464 A1 | 5/1996 |
| WO | 03035961 A2 | 5/2003 |
| WO | 2013038293 A1 | 3/2013 |
| WO | 2013118027 A1 | 8/2013 |

OTHER PUBLICATIONS

PCT Patent Application No. PCT/US2014/032109, International Preliminary Report on Patentability, Sep. 29, 2015, 11 pages.
U.S. Appl. No. 14/229,913, Non-final Office action, Jun. 27, 2014, 12 pages.
U.S. Appl. No. 14/229,913, Notice of Allowance, Nov. 7, 2014, 11 pages.

USER INTERFACE FOR WHITE GOODS AND ASSOCIATED MULTI-CHANNEL PROXIMITY SENSORS

CROSS REFERENCES TO RELATED APPLICATIONS

This application is a non-provisional of U.S. Provisional Application No. 61/806,414, entitled USER INTERFACE FOR WHITE GOODS AND ASSOCIATED MULTI-CHANNEL PROXIMITY SENSORS, and filed on Mar. 29, 2013 by inventors Thomas Eriksson, Stefan Holmgren, Carl Richard Henriksson and Stefan Östergårde, the contents of which are hereby incorporated herein in their entirety by reference.

This application is a continuation-in-part of U.S. patent application Ser. No. 14/140,635 entitled LIGHT-BASED PROXIMITY DETECTION SYSTEM AND USER INTERFACE, and filed on Dec. 26, 2013 by inventors Thomas Eriksson and Stefan Holmgren, the contents of which are hereby incorporated herein in their entirety by reference.

U.S. patent application Ser. No. 14/140,635 is a continuation of U.S. patent application Ser. No. 13/732,456, now U.S. Pat. No. 8,643,628, entitled LIGHT-BASED PROXIMITY DETECTION SYSTEM AND USER INTERFACE, and filed on Jan. 2, 2013 by inventors Thomas Eriksson and Stefan Holmgren.

U.S. patent application Ser. No. 13/732,456 claims the benefit of U.S. Provisional Patent Application No. 61/713,546 entitled LIGHT-BASED PROXIMITY DETECTION SYSTEM AND USER INTERFACE, and filed on Oct. 14, 2012 by inventor Stefan Holmgren.

This application is a continuation-in-part of U.S. patent application Ser. No. 14/088,458 entitled LIGHT-BASED TOUCH CONTROLS ON A STEERING WHEEL AND DASHBOARD, and filed on Nov. 25, 2013 by inventors Gunnar Martin Fröjdh, Simon Fellin, Thomas Eriksson, John Karlsson, Maria Hedin and Richard Berglind, the contents of which are hereby incorporated herein in their entirety by reference.

U.S. patent application Ser. No. 14/088,458 claims the benefit of U.S. Provisional Application No. 61/730,139 entitled LIGHT-BASED TOUCH CONTROLS ON A STEERING WHEEL AND DASHBOARD, and filed on Nov. 27, 2012 by inventors Gunnar Martin Fröjdh, Thomas Eriksson, John Karlsson, Maria Hedin and Richard Berglind.

U.S. patent application Ser. No. 14/088,458 is a continuation-in-part of U.S. patent application Ser. No. 13/854,074 entitled LIGHT-BASED FINGER GESTURE USER INTERFACE, and filed on Mar. 30, 2013 by inventors Thomas Eriksson, Per Leine, Jochen Laveno Mangelsdorff, Robert Pettersson, Anders Jansson and Magnus Goertz.

U.S. patent application Ser. No. 13/854,074 is a continuation of U.S. patent application Ser. No. 13/424,592, now U.S. Pat. No. 8,416,217, entitled LIGHT-BASED FINGER GESTURE USER INTERFACE, and filed on Mar. 20, 2012, by inventors Thomas Eriksson, Per Leine, Jochen Laveno Mangelsdorff, Robert Pettersson, Anders Jansson and Magnus Goertz.

U.S. patent application Ser. No. 13/424,592 claims the benefit of U.S. Provisional Patent Application No. 61/564,868 entitled LIGHT-BASED FINGER GESTURE USER INTERFACE, and filed on Nov. 30, 2011 by inventors Thomas Eriksson, Per Leine, Jochen Laveno Mangelsdorff, Robert Pettersson and Anders Jansson.

U.S. patent application Ser. No. 13/424,592 is a continuation-in-part of U.S. application Ser. No. 12/760,568, entitled OPTICAL TOUCH SCREEN SYSTEMS USING WIDE LIGHT BEAMS, and filed on Apr. 15, 2010 by inventors Magnus Goertz, Thomas Eriksson and Joseph Shain.

U.S. patent application Ser. No. 12/760,568 claims the benefit of U.S. Provisional Patent Application No. 61/169,779, entitled OPTICAL TOUCH SCREEN, and filed on Apr. 16, 2009 by inventors Magnus Goertz, Thomas Eriksson and Joseph Shain.

U.S. patent application Ser. No. 12/760,568 is a continuation-in-part of U.S. application Ser. No. 12/371,609, now U.S. Pat. No. 8,339,379, entitled LIGHT-BASED TOUCH SCREEN, and filed on Feb. 15, 2009 by inventors Magnus Goertz, Thomas Eriksson and Joseph Shain.

U.S. patent application Ser. No. 14/088,458 is a continuation-in-part of U.S. patent application Ser. No. 13/775,269 entitled REMOVABLE PROTECTIVE COVER WITH EMBEDDED PROXIMITY SENSORS, and filed on Feb. 25, 2013 by inventors Thomas Eriksson, Stefan Holmgren, John Karlsson, Remo Behdasht, Erik Rosengren and Lars Sparf.

U.S. patent application Ser. No. 13/775,269 claims the benefit of U.S. Provisional Patent Application No. 61/713,546 entitled LIGHT-BASED PROXIMITY DETECTION SYSTEM AND USER INTERFACE, and filed on Oct. 14, 2012 by inventor Stefan Holmgren.

U.S. patent application Ser. No. 14/088,458 is a continuation-in-part of U.S. patent application Ser. No. 13/424,543 entitled OPTICAL ELEMENTS WITH ALTERNATING REFLECTIVE LENS FACETS, and filed on Mar. 20, 2012 by inventors Stefan Holmgren, Lars Sparf, Magnus Goertz, Thomas Eriksson, Joseph Shain, Anders Jansson, Niklas Kvist, Robert Pettersson and John Karlsson.

U.S. patent application Ser. No. 13/424,543 claims priority benefit of U.S. Provisional Patent Application No. 61/564,164, entitled OPTICAL ELEMENTS WITH ALTERNATING REFLECTIVE LENS FACETS, and filed on Nov. 28, 2011 by inventors Stefan Holmgren, Lars Sparf, Thomas Eriksson, Joseph Shain, Anders Jansson, Niklas Kvist, Robert Pettersson and John Karlsson.

U.S. patent application Ser. No. 13/424,543 is a continuation-in-part of PCT Application No. PCT/US11/29191 entitled LENS ARRANGEMENT FOR LIGHT-BASED TOUCH SCREEN, and filed on Mar. 21, 2011 by inventors Magnus Goertz, Thomas Eriksson, Joseph Shain, Anders Jansson, Niklas Kvist, Robert Pettersson, Lars Sparf and John Karlsson.

U.S. patent application Ser. No. 13/424,543 is a continuation-in-part of U.S. patent application Ser. No. 12/760,567 entitled OPTICAL TOUCH SCREEN SYSTEMS USING REFLECTED LIGHT and filed on Apr. 15, 2010.

PCT Application No. PCT/US11/29191 claims the benefit of U.S. Provisional Patent Application No. 61/379,012 entitled OPTICAL TOUCH SCREEN SYSTEMS USING REFLECTED LIGHT, and filed on Sep. 1, 2010 by inventors Magnus Goertz, Thomas Eriksson, Joseph Shain, Anders Jansson, Niklas Kvist and Robert Pettersson; the benefit of U.S. Provisional Patent Application No. 61/380,600 entitled OPTICAL TOUCH SCREEN SYSTEMS USING REFLECTED LIGHT, and filed on Sep. 7, 2010 by inventors Magnus Goertz, Thomas Eriksson, Joseph Shain, Anders Jansson, Niklas Kvist and Robert Pettersson; and the benefit of U.S. Provisional Patent Application No. 61/410,930 entitled OPTICAL TOUCH SCREEN SYSTEMS USING REFLECTED LIGHT, and filed on Nov. 7, 2010 by inventors Magnus Goertz, Thomas Eriksson, Joseph Shain, Anders Jansson, Niklas Kvist, Robert Pettersson and Lars Sparf.

FIELD OF THE INVENTION

The field of the present invention is light-based proximity sensors and graphical user interfaces for large electrical goods used domestically, inter alia, refrigerators, ovens and washing machines. These goods are collectively known as "white goods" because formerly these items were typically finished with white enamel.

BACKGROUND OF THE INVENTION

Conventional touch sensitive virtual buttons, i.e., buttons painted on a stationary flat surface and actuated by touch, are capacitance-based or resistance-based. Certain touch sensitive user input systems detect hovering objects as well. Examples include U.S. Publication No. 2008/0012835 A1 for HOVER AND TOUCH DETECTION FOR DIGITIZER and U.S. Publication No. 2006/0244733 A1 for TOUCH SENSITIVE DEVICE AND METHOD USING PRE-TOUCH INFORMATION.

Prior art hover detection systems based on reflected light determine a height of an object above a surface based on an amount of reflected light: the nearer the object—the more light is reflected onto the detector situated beneath the touch surface. Therefore, prior art systems are able to detect a hovering object over time and determine whether the object is moving closer or farther away based on relative amounts of detected light. I.e., diminishing light detection over time indicates an object moving away from the surface, and increasing light detection over time indicates an object moving toward the surface. In other words, the determined height is relative to other heights in a series of detections, but the actual height remains unknown. Indeed, different materials reflect different amounts of light, e.g., a white glove reflects more light than a black glove, and the reflective properties of a hovering object are not known by the system. Therefore, the system cannot determine the height at which the object is situated above the surface based on the amount of reflected light detected. In addition, because prior art proximity detectors require a series of detections of the object at different heights in order to rank the heights in relation to each other, a single proximity detection or a series of detections of a stationary hovering object will provide little information about the height of the object.

White goods typically have multiple controls that are set by a user. For example, a washing machine has controls for selecting the size of a wash load (e.g., large, medium, small), the fabric (e.g., cotton, synthetic, wool) and the temperature (e.g., hot, warm, cold). Some white goods have control panels having multiple touch-sensitive controls. In accordance with an embodiment of the present invention, white good control panels use light-based proximity sensors.

One problem with prior art proximity sensors is that they are prone to false touch detection, especially when the user wears shiny jewelry that reflects light onto a proximity sensor. For example, assume an array of controls placed together on a control panel, where a respective proximity sensor is situated underneath each control. When a user approaches or touches one control, a ring on the user's finger may reflect either ambient light, or light from one of the proximity sensors in the array, onto an unintended neighboring proximity sensor. This will erroneously activate the neighboring control. It would be advantageous to have a robust proximity sensor that distinguishes between intended touches and inadvertent reflections.

SUMMARY

Aspects of the present invention relate to touch sensitive surfaces used to implement tap-activated button controls, switches and slider controls for household appliances such as washing machines, refrigerators, ovens and cooktops.

Aspects of the present invention also relate to graphical user interfaces (GUIs) designed for white good applications.

Cooktops

There is thus provided in accordance with an embodiment of the present invention a cooktop including a surface on which to place pots containing food to be heated, a plurality of heating elements and their corresponding control circuits, situated underneath the surface, for heating the food in the pots, wherein each heating element is associated with a respective section of one or more edges of the surface, a plurality of sources of visible light arranged along the one or more edges of the surface, a proximity sensor directed at the airspace in front of the cooktop for detecting a person approaching the surface, the proximity sensor including an infrared light emitter for projecting light onto the approaching person, and an infrared light receiver adjacent to the light emitter for receiving a portion of the projected light reflected by the person, and a processor mounted beneath the surface connected to the proximity sensor and to the visible light sources, for illuminating the visible light sources when the approaching person is detected by the proximity sensor.

Additionally in accordance with an embodiment of the present invention, the cooktop further includes a first plurality of optical sensors arranged along the one or more edges of the surface for detecting a location of a pot positioned above one of the heating elements, and not touching the surface, wherein the processor activates certain of the visible light sources to illuminate the section of the one or more edges associated with the heating element above which the pot is positioned, and deactivates the remaining visible light sources.

Further in accordance with an embodiment of the present invention, the optical sensors along the edges of the cooktop identify one or more of the heating elements over which pots are placed on the surface, and the processor activates certain of the visible light sources to illuminate the sections of the one or more edges associated with those heating elements over which the pots are placed.

Yet further in accordance with an embodiment of the present invention, the cooktop further includes a second plurality of optical sensors situated along the one or more edges and coupled with the control circuits, whereby each of the control circuits enables its heating element to be controlled via touch gestures detected by the second plurality of optical sensors at the section of the one or more edges associated with its heating element, when that section is illuminated by the visible light sources.

Moreover in accordance with an embodiment of the present invention, each of the cooktop control circuits is operative to raise the temperature of its heating element, in response to detection by the second plurality of optical sensors of a glide gesture at the section of the one or more edges associated with its heating element, and the processor increases an illumination intensity of the visible light sources at that section, to indicate the rise in temperature.

Additionally in accordance with an embodiment of the present invention, the cooktop proximity sensor is mounted in a ventilation hood situated above the cooktop, and each of the control circuits is operative to raise the temperature of its heating element in response to a hand wave gesture in the airspace opposite the ventilation hood detected by the proximity sensor.

Ovens and Stoves

There is further provided in accordance with an embodiment of the present invention an appliance including a hollow for holding items for use with the appliance, a door for opening and closing the hollow, a transparent panel having an exposed cylindrical surface situated above the door, a display behind the panel and visible through the panel, an array of proximity sensors arranged along an edge of the panel for detecting nearby objects and for detecting user gestures performed on the exposed cylindrical surface of the panel, the proximity sensors including infrared light emitters for projecting light onto an object near the panel, and infrared light receivers adjacent to the light emitters for receiving a portion of the projected light reflected by the object, and a processor connected to the proximity sensors and to the display, for presenting information on the display in response to the user gestures detected by the proximity sensors.

Yet further in accordance with an embodiment of the present invention, the appliance includes an auxiliary proximity sensor mounted in the appliance and connected to the processor, for detecting a person approaching the appliance, and sources of visible light separate from the display mounted behind the panel and connected to the processor, wherein the processor is operative to illuminate the visible light sources in response to the auxiliary proximity sensor detecting the approaching person.

Moreover, in accordance with an embodiment of the present invention, the processor is operative to display user control icons on the panel in response to the proximity sensor array detecting an object near the panel.

Additionally, in accordance with an embodiment of the present invention, when the appliance is in use, the user control icons display current appliance settings.

Further in accordance with an embodiment of the present invention, a configurable appliance setting is presented on the display in a scroll-bar graphic, and the processor is operative to adjust the appliance setting in response to the proximity sensor array detecting a glide gesture along the scroll-bar graphic.

Yet further in accordance with an embodiment of the present invention, the configurable appliance setting is a temperature setting or a time setting.

Moreover in accordance with an embodiment of the present invention, the appliance is a member of the group consisting of a dishwasher, a refrigerator, a washing machine and an oven.

Appliance Control Hub

There is additionally provided in accordance with an embodiment of the present invention a stationary appliance including a stationary appliance housing including a socket for a mobile appliance control hub, a display panel mounted on an inner wall of the socket that is covered by the control hub in the socket and exposed when the control hub is removed from the socket, and the mobile appliance control hub, including a mobile housing configured to be inserted into the socket and removed therefrom, circuitry mounted in the mobile housing for wireless communication with the stationary appliance and with at least one additional appliance, a touchscreen mounted in the mobile housing for presenting controls for operating the stationary appliance and for operating the at least one additional appliance, and a rechargeable battery mounted in said mobile housing that is coupled to an electrical outlet provided in the socket when the hub is inserted into the socket.

Further in accordance with an embodiment of the present invention, the touchscreen presents icons identifying the stationary appliance and the at least one additional appliance, and presents current settings for the stationary appliance and the at least one additional appliance, in a single screen.

Refrigerator and Freezers

There is yet further provided in accordance with an embodiment of the present invention an appliance including a hollow for holding items for use with the appliance, a door for opening and closing the hollow, including a panel of electrically switchable glass having an opaque light transmission state that changes to a transparent state when voltage is applied, a proximity sensor mounted in the door for detecting hand wave gestures in the airspace opposite the door, and a processor connected to the panel and to the proximity sensor for applying a voltage to the glass to enter the transparent state in response to the proximity sensor detecting a hand wave gesture.

Moreover in accordance with an embodiment of the present invention, the appliance is one of a refrigerator and a freezer.

There is additionally provided in accordance with an embodiment of the present invention an appliance including a storage hollow for storing items for use with the appliance, a door for opening and closing the storage hollow, a handle on the front of the door forming a cavity positioned and sized to permit several fingers to grip the handle, a first proximity sensor mounted in the door for detecting an approaching user, a light source mounted in the perimeter of the handle cavity and connected to the processor, for illuminating the handle cavity, and a processor connected to the proximity sensor for illuminating the light source in response to the proximity sensor detecting the approaching user.

Further in accordance with an embodiment of the present invention, the appliance includes a second proximity sensor mounted in the perimeter of the handle cavity and connected to the processor, for detecting the grip, and at least one illuminable icon on an outward-facing surface of the door handle, connected to the processor, wherein the processor illuminates the icon in response to the second proximity sensor detecting the grip of the handle.

Yet further in accordance with an embodiment of the present invention, the processor is operative to intensify illumination of the light source illumination in response to the second proximity sensor detecting the grip of the handle.

Moreover in accordance with an embodiment of the present invention, the illuminated icon displays a temperature setting for the appliance.

Additionally in accordance with an embodiment of the present invention, the processor adjusts the temperature setting in response to the second proximity sensor detecting a directional movement of the inserted fingers within the handle cavity.

Further in accordance with an embodiment of the present invention, the processor is operative to release an inner vacuum in the storage hollow to facilitate opening the door, in response to the second proximity sensor detecting the grip of the handle.

Yet further in accordance with an embodiment of the present invention, the appliance is a member of the group consisting of a dishwasher, a refrigerator, a freezer, a washing machine and an oven.

Washing Machines and Clothes Dryers

There is moreover provided in accordance with an embodiment of the present invention an appliance including a touch sensitive panel on which a plurality of icons representing different settings are displayed, and including a demarcated area separate from the icons, and a processor connected with the panel, operative to select an icon's setting in response to detecting a finger gliding from that icon into the demarcated area.

Light-Based Touch Sensors

There is additionally provided in accordance with an embodiment of the present invention a touch sensor including a housing, a light guide mounted in the housing including an aperture through which light exits and enters the light guide, and an inner surface facing the interior of the housing, two light emitters mounted in the housing for emitting light beams into the light guide that exit the aperture at diverging angles, and a light receiver mounted in the housing for receiving reflected light beams entering the aperture at an angle of incidence different than the diverging angles. In some embodiments the diverging light beams exit the aperture at one and the same location on the aperture that the reflected light beams enter the aperture.

There is further provided in accordance with an embodiment of the present invention a touch sensor including a housing, a light guide mounted in the housing including an aperture through which light exits and enters the light guide, and an inner surface facing the interior of the housing, a light emitter mounted in the housing for emitting light beams into the light guide that exit the light guide at the aperture, and two light receivers mounted in the housing for receiving reflected light beams entering the light guide at the aperture at two different angles of incidence. In some embodiments the diverging light beams enter the aperture at one and the same location on the aperture that the emitted light beams exit the aperture.

BRIEF DESCRIPTION OF THE DRAWINGS

The present invention will be more fully understood and appreciated from the following detailed description, taken in conjunction with the drawings in which.

Figure 1:
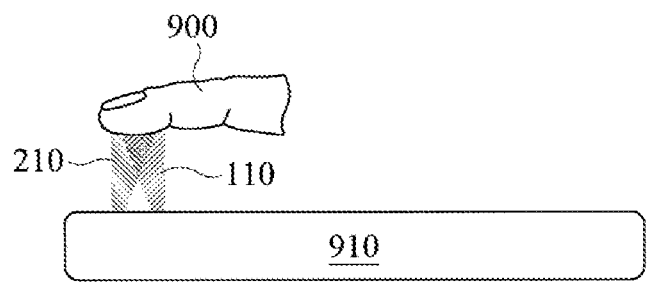
FIG. 1 is a simplified illustration of a proximity sensor having one emitter-detector channel, in accordance with an embodiment of the present invention.

In this specification and in the figures, the following numbering scheme is used. Light emitting elements and emitted light beams are numbered in the range of 100-199. Light receiving elements such as PDs, and reflected light beams are numbered in the range of 200-299. Lens components, reflective and refractive elements are numbered in the range of 300-399. Fingers, styli, electronic devices and their housings are numbered in the range of 800-999.

The following tables catalog the numbered elements and list the figures in which each numbered element appears.

| Emitters and Emitter Beams | | |
|---|---|---|
| Element | Figures | Description |
| 110 | 1 | emitter beam |
| 111, 112 | 2, 30, 31 | emitter beam |
| 113, 114 | 3 | emitter beam |
| 121 | 4, 21, 23, 26, 27, 29-31 | emitter |
| 122 | 7-16, 18, 30 | emitter |
| 123 | 7, 8 | emitter beam |
| 124 | 12, 13 | emitter beam |
| 126 | 23 | emitter beams |
| 130 | 23, 27, 28 | emitter beam |

| Receivers and Receiver Beams | | |
|---|---|---|
| Element | Figures | Description |
| 210 | 1 | receiver beam |
| 211, 212 | 2, 30, 31 | receiver beam |
| 213 | 3 | receiver beam |
| 221 | 4-6, 21, 22, 23, 28, 29, 31 | receiver |
| 222 | 7-13, 21, 22, 28-31 | receiver |
| 222.1, 222.2 | 15, 16, 18 | receiver |
| 222.3, 222.4 | 16, 18 | receiver |
| 223 | 7, 8 | receiver beam |
| 224, 225 | 12, 13 | receiver beam |
| 230, 231 | 22, 27, 28 | receiver beam |

| Lenses | | |
|---|---|---|
| Element | Figures | Description |
| 301 | 4-10 | lens |
| 302 | 11, 12 | lens |
| 303 | 14 | lens |
| 303.1-303.3 | 15-17 | lens section |
| 320 | 17 | diagonal face |
| 321 | 21-23, 25, 26, 28-34 | light guide |
| 322-324 | 33, 34 | reflective light guide wedge |
| 330 | 65-67 | light guide frame |
| 332 | 71 | embossed light guide |
| 333 | 30, 31 | aperture |

| Miscellaneous Elements | | |
|---|---|---|
| Element | Figures | Description |
| 801 | 56 | appliance icons |
| 802 | 56 | clock |
| 803 | 56 | notification |
| 805 | 57 | oven icon |
| 806 | 59 | battery |
| 807 | 59 | communication circuitry |
| 810 | 53, 60 | dishwasher |
| 811 | 60 | dishwasher control panel |
| 812 | 44 | appliance door |
| 820 | 61-63 | refrigerator |
| 821 | 61-63 | refrigerator door |
| 822 | 63, 64 | handle cavity |
| 823 | 63, 64 | refrigerator door handle |
| 824 | 64 | temperature display |
| 825 | 64 | arrow indicating movement |
| 826 | 64 | glow |
| 827 | 61 | voltage source |
| 828 | 35, 61, 63 | proximity sensor |
| 829 | 35, 44, 61, 63, 69 | processor |
| 830 | 65, 66, 68 | water dispenser control panel |
| 831 | 44, 59, 65-67 | display |
| 832 | 65-67 | touch sensitive buttons |
| 835 | 65 | water dispenser shaft illumination |
| 836 | 68 | water dispenser touch icon |
| 837 | 68 | water glass |
| 840 | 70, 73, 75 | washing machine |
| 841 | 70, 71 | washing machine control panel |
| 843 | 71 | slider groove |
| 844 | 71 | circular groove |
| 845 | 71 | digital display |
| 846 | 71 | sunken buttons |
| 847 | 69 | icons |
| 848 | 69 | demarcated area |
| 850, 860, 870 | 72-76 | washing machine control panel |
| 851 | 72 | recessed area |
| 852 | 72 | dragging an icon |
| 853 | 69 | washing machine |
| 861, 862 | 74 | curved light guide |
| 863-866, 872 | 74, 76 | washing machine controls |
| 871 | 76 | array of proximity sensors |
| 900 | 1, 2, 3, 6, 41, 72 | finger |
| 901 | 2, 3 | finger |
| 910 | 1-3 | device |
| 921 | 4-10 | upper casing part |
| 922 | 4-10 | lower casing part |

-continued

| Miscellaneous Elements | | |
|---|---|---|
| Element | Figures | Description |
| 923 | 4-10, 21-23, 25-31 | PCB |
| 924 | 9, 10 | isolating barrier |
| 931 | 11 | upper casing part |
| 932 | 11 | lower casing part |
| 938 | 43, 62-64 | hand |
| 939 | 69 | finger |
| 941 | 14-17 | upper casing part |
| 942 | 14-17 | lower casing part |
| 943 | 16 | PCB |
| 945 | 17 | air gap |
| 950 | 19 | light transmissive cover |
| 951 | 19 | cross shape |
| 966 | 20-27, 69 | touch panel |
| 967 | 20, 24-27, 32 | touch control |
| 969 | 35 | heating element control |
| 970 | 36-41, 53 | induction cooktop |
| 971 | 35-41, 56 | kitchen counter |
| 972, 975 | 37-41 | radiance of light |
| 973 | 38-41 | saucepan |
| 974 | 40, 41 | pot |
| 976 | 42, 43 | temperature control |
| 977 | 42, 43 | range exhaust hood |
| 978 | 35 | surface |
| 979 | 35 | heating element |
| 980 | 44, 45 | oven |
| 981 | 45 | UI panel |
| 982 | 45 | clock |
| 983 | 45 | icons |
| 984 | 45 | slider control |
| 985 | 46-52 | oven touch panel |
| 986, 988 | 49, 52 | tap touch controls |
| 987 | 51 | slider touch control |
| 989 | 50 | oven settings |
| 990 | 53, 54, 56-59 | appliance control hub |
| 991, 992 | 53-55 | oven |
| 993 | 35, 63 | visible light source |
| 994 | 44 | cylindrical panel |
| 995 | 55 | hub socket |
| 996 | 44 | array of proximity sensors |
| 997 | 35 | section of an edge |

DETAILED DESCRIPTION

Aspects of the present invention relate to light-based touch controls such as virtual buttons, sliders and touch pads. Aspects of the present invention also relate to proximity sensors for hover gestures, tap gestures and sweep gestures. According to embodiments of the present invention, a light-based touch control and proximity sensor includes infra-red light-emitting diodes (LEDs) and photo-diodes (PDs) situated inside a housing for an electronic device, beneath an infra-red-transmissive section of the housing. The LEDs project light substantially incident to the housing surface, through the transmissive section. When an object touches or approaches the transmissive section, it reflects the light back into the housing where it is detected by the PDs. Each detection of reflected light represents a detection channel.

A proximity sensor having only one LED and one PD has a single detection channel that provides one signal. In principle this signal provides binary (yes/no) information as to whether or not an object is present above the sensor. In addition, this signal provides information as to a direction of movement of the object along the proximity axis, i.e., whether the object is moving toward the sensor or away from the sensor. Thus, if the signal increases over time, the object is moving toward the sensor, whereas if the signal decreases over time, the object is moving away from the sensor.

Reference is made to FIG. 1, which is a simplified illustration of a proximity sensor having one emitter-detector channel, in accordance with an embodiment of the present invention. FIG. 1 illustrates an embodiment whereby one LED and one PD are situated together beneath a control surface embedded in the housing. In this embodiment one detection channel is provided.

FIG. 1 shows a portable electronic device 910 in profile view. An emitter beam 110 is projected above the device and is reflected 210 back into the device by a finger 900 placed above the device. Thus, the light channel 110-210 is provided to detect a proximal finger 900.

As explained hereinabove, one example of the limitations of a single channel is that it is impossible determine a distance of the object from the sensor based on the strength of the detection signal since different objects can be used that have different reflective properties. For example, a black glove near the sensor and a white glove further away from the sensor provide substantially similar levels of detection. More channels generate more information. However, an extra channel does not necessitate adding an additional LED and an additional PD. Rather, several PDs can share the light from one LED to provide multiple detection channels. Similarly, one PD can provide multiple detection channels when it is able to receive reflected light from several LEDs.

Figure 2:
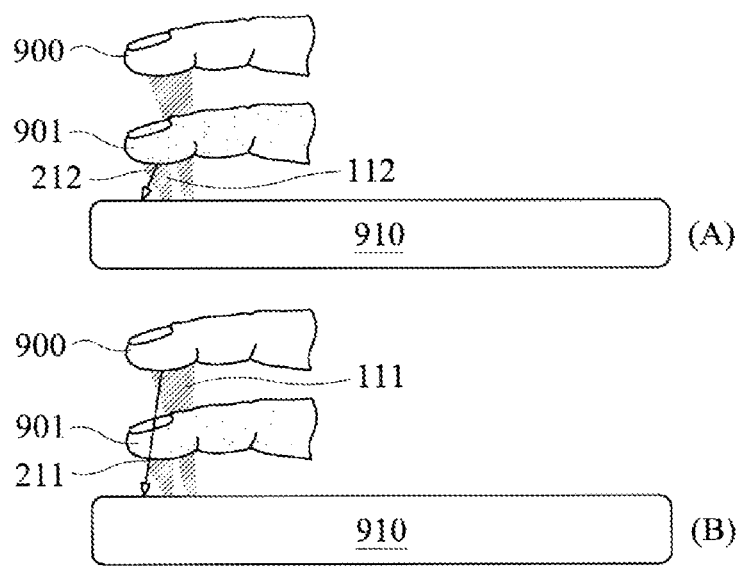
FIG. 2 is a simplified illustration of a first configuration of a proximity sensor having two emitter-detector channels, in accordance with an embodiment of the present invention.

Reference is made to FIG. 2, which is a simplified illustration of a first configuration of a proximity sensor having two emitter-detector channels, in accordance with an embodiment of the present invention. FIG. 2 illustrates two LEDs and one PD situated in a row beneath a control surface embedded in the housing. This row of two LEDs and one PD has one of the LEDs placed between the other LED and the PD. In this embodiment two detection channels are provided. With two channels positional information along one dimension can be generated by interpolation.

FIG. 2 shows a portable electronic device 910 in profile view and two emitter-detector light channels. Thus, FIG. 2(A) demonstrates a first light channel 112-212 that detects a near finger 901; and FIG. 2(B) demonstrates a second light channel 111-211 that detects a more distal finger 900. The emitter beams 111 and 112 issue forth from the upper surface of device 910 at an angle in order that their respective reflected beams arrive at the location of the detector. The proximity detector of FIG. 2 provides an indication of the height of the object based on which channel is detected. An interpolation of signals from the two channels will indicate a position of the object within the range of heights detected by both channels.

By contrast, prior art proximity detectors determine proximity based on a relative intensity of a reflected signal and require a series of detections in order to rank the different signals, as explained hereinabove. Thus, the system of FIG. 2 addresses two shortcomings of the prior art: (1) it provides an indication of the absolute height of the object above the screen, as opposed to a relative height; and, (2) it provides this indication based on detections of a stationary object and does not require a series of detections over time.

Two similar detection channels are provided by two detectors and one emitter, for example by replacing the emitters of the FIG. 2 system with detectors, and replacing the detector of the FIG. 2 system with an emitter. In this case, beams 211 and 212 are one and the same emitter beam issued by the one emitter, and the reflected beam 111 or 112 arrives at one of the two detectors depending on the height of the finger 900 or 901 above the device 910.

Figure 3:
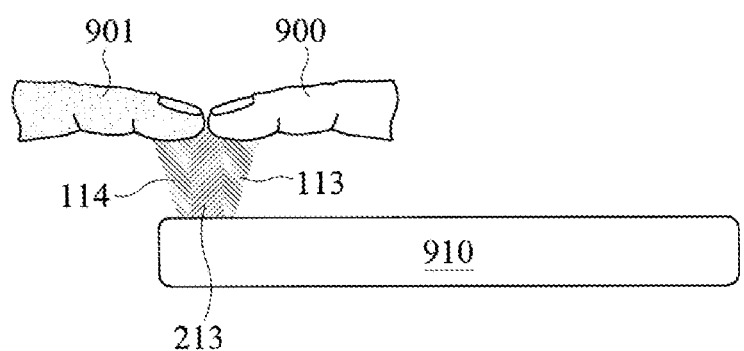
FIG. 3 is a simplified illustration of a second configuration of a proximity sensor having two emitter-detector channels, in accordance with an embodiment of the present invention.

Reference is made to FIG. 3, which is a simplified illustration of a second configuration of a proximity sensor having two emitter-detector channels, in accordance with an embodiment of the present invention. FIG. 3 shows a portable device 910 with two detection channels, but in this case the detector is situated between the two emitters and the two channels provide lateral position information. A first emitter beam 113 is projected above the device to the right of the detector, and a second emitter beam 114 is projected above the device to the left of the detector. When a finger hovers above the space between the first emitter and the detector, as illustrated by finger 900 in FIG. 3, it creates a first detection channel 113-213. When a finger hovers above the space between the second emitter and the detector, as illustrated by finger 901 in FIG. 3, it creates a second detection channel 114-213. An interpolation of signals from the two channels indicates a position of the object between the outermost components. As explained hereinabove, the emitters and detectors may be swapped and still provide two similar detection channels.

Aspects of the present invention relate to providing a thin window spanning the height or thickness of a device, such as a mobile phone. The user interacts with the phone by performing finger gestures against this window, and the proximity sensor detects the position or gesture of the finger. One application is to replace physical buttons. In the most basic case light from an LED is sent out of the device and reflected by the finger. The reflected light is detected by two PDs situated on either side of the LED and the position of the finger is interpolated from the signals. For instance such an arrangement may replace the volume buttons on a mobile phone. In principle such an arrangement may have limited proximity functionality. This conceptual model can be extended with additional components.

Figure 4:
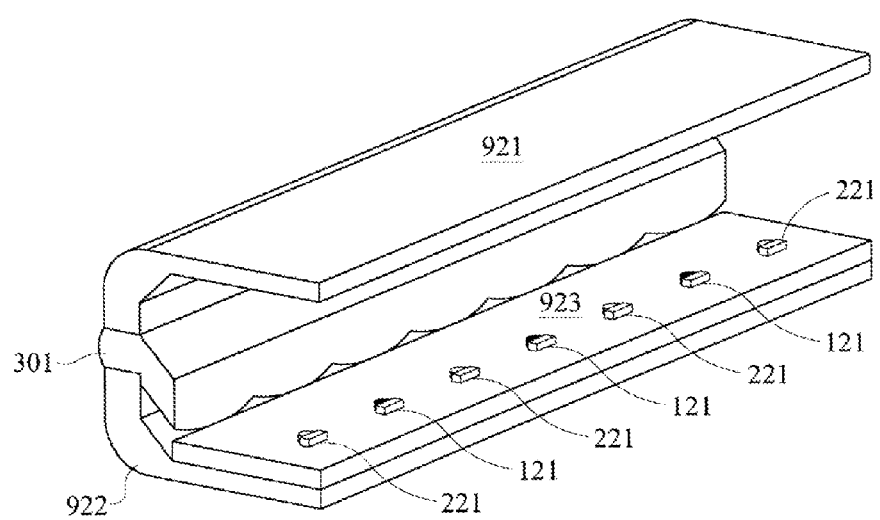
FIGS. 4 and 5 are simplified diagrams of a touch sensitive slider window having multiple emitter-detector channels that detect a location of a finger along the length of the window, in accordance with an embodiment of the present invention.
Figure 5:
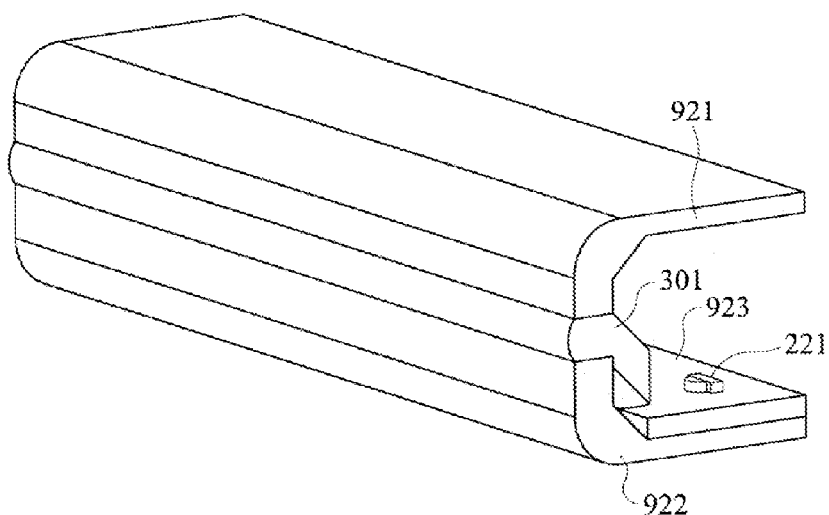
Figure 6:
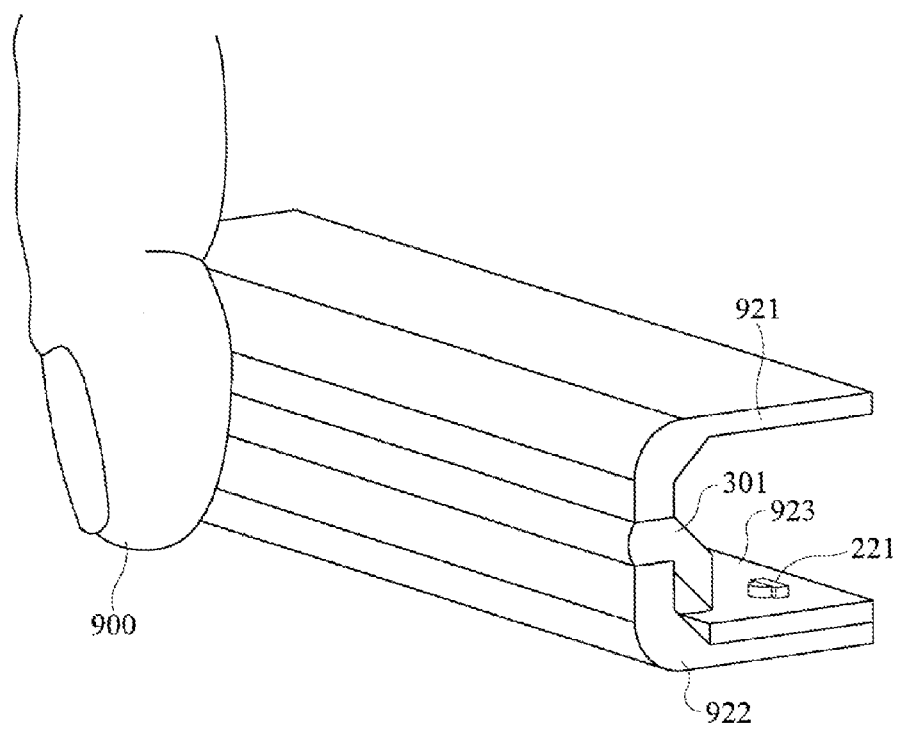
FIG. 6 is a simplified illustration of a finger placed along the touch sensitive slider window of FIGS. 4 and 5, in accordance with an embodiment of the present invention.

Reference is made to FIGS. 4 and 5, which are simplified diagrams of a touch sensitive slider window having multiple emitter-detector channels that detect a location of a finger along the length of the window, in accordance with an embodiment of the present invention. Reference is also made to FIG. 6, which is a simplified illustration of a finger placed along the touch sensitive slider window of FIGS. 4 and 5, in accordance with an embodiment of the present invention. FIGS. 4 and 5 show front and back views of a touch sensitive slider window featuring multiple emitter-detector channels that detect a location of a finger along the length of the window. FIGS. 4 and 5 show a sidewall of a device housing formed by an upper casing part 921 and a lower casing part 922. A lens 301 is wedged between casing parts 921 and 922. FIGS. 4 and 5, and in particular FIG. 4, show a PCB 923 placed inside the device housing. Light emitters 121 and light detectors 221 are mounted in an alternating row on PCB 923. Every emitter-detector pair of neighboring elements provides a detection channel for detecting an object touching the outer side edge of the housing along the length of lens 301, as illustrated by finger 900 in FIG. 6.

When the emitters and detectors are placed together inside the housing, light scatters inside the housing when an emitter is activated and a portion of the scattered light arrives at the detectors without being reflected by an object outside lens 301. In order to minimize the amount of scattered light that reaches the detectors, the emitters and detectors are mounted on PCB 923 facing opposite directions.

Figure 7:
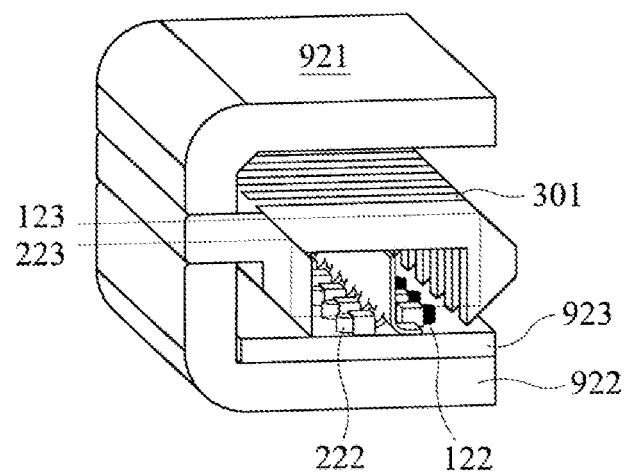
FIGS. 7-10 are simplified diagrams showing different views of a touch sensitive slider window having multiple emitter-detector channels that detect a location of a finger along the length of the window, in accordance with an embodiment of the present invention.
Figure 8:
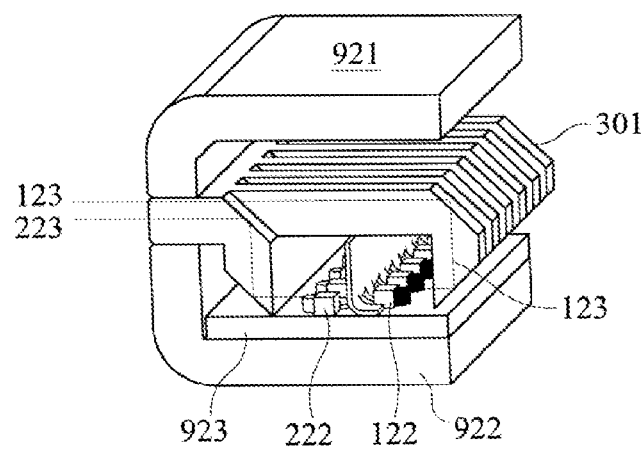
Figure 9:
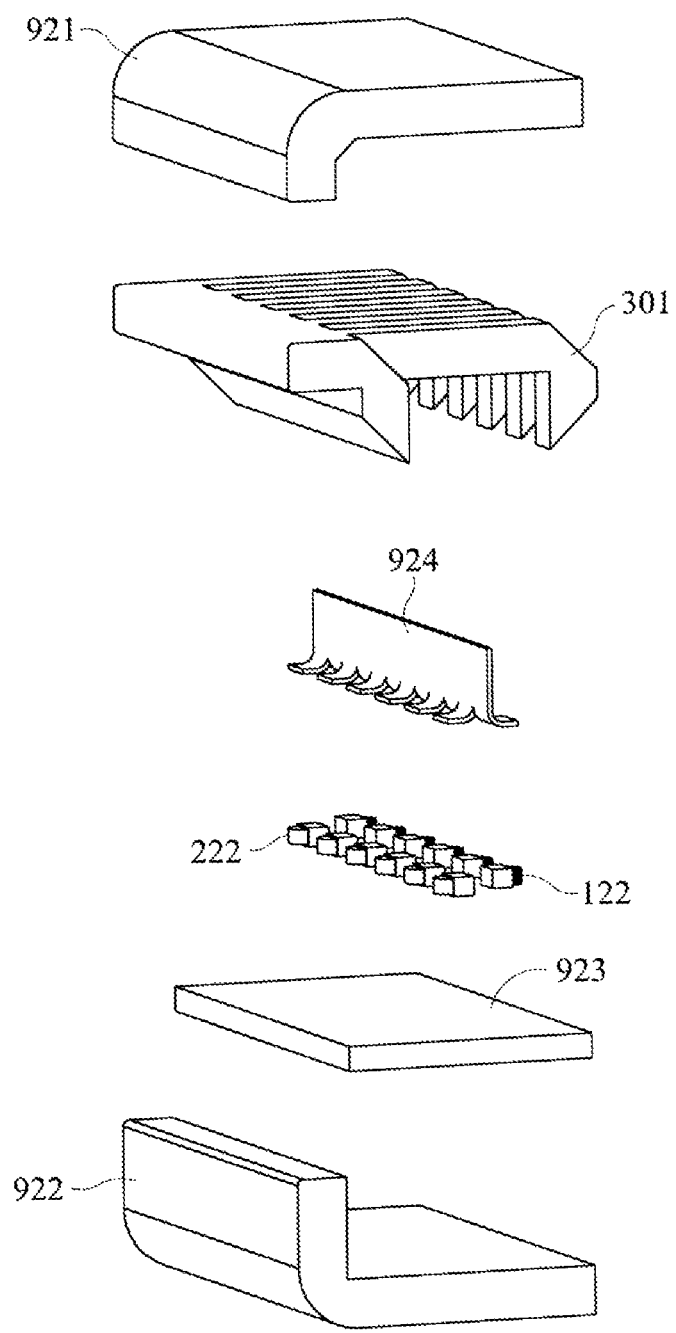
Figure 10:
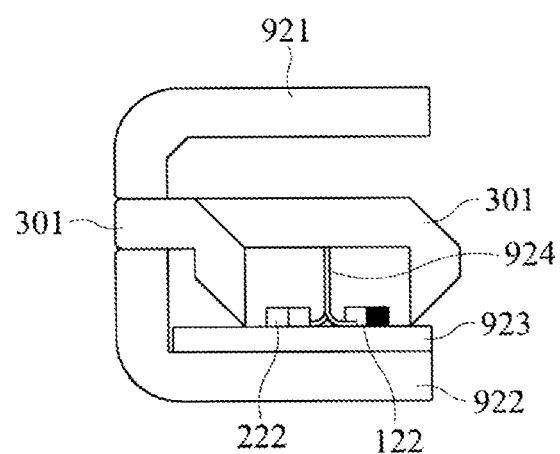

Reference is made to FIGS. 7-10, which are simplified diagrams showing different views of a touch sensitive slider window having multiple emitter-detector channels that detect a location of a finger along the length of the window, in accordance with an embodiment of the present invention. FIGS. 7-10 show inward-facing emitters 122 and outward-facing detectors 222. In addition, an isolating barrier 924 is placed between the emitters and the detectors to further shield the detectors from scattered light. FIG. 9 is an exploded view of this configuration. FIG. 10 is a cross-section view of the same configuration.

Lens 301 in FIGS. 7-10 is more complex than lens 301 in FIGS. 4 and 5. In FIGS. 7-10, in order to direct light from the inward-facing emitters out through lens 301 and back onto the outward-facing detectors, lens 301 extends over and around the emitters 122 but not the detectors 222. Two light paths are shown in FIGS. 7 and 8. Emitter beam 123 is reflected twice inside lens 301 before it travels over emitter 122 and out of the device. Incoming beam 223 enters lens 301 and is reflected twice inside the lens before arriving at detector 222.

Figure 11:
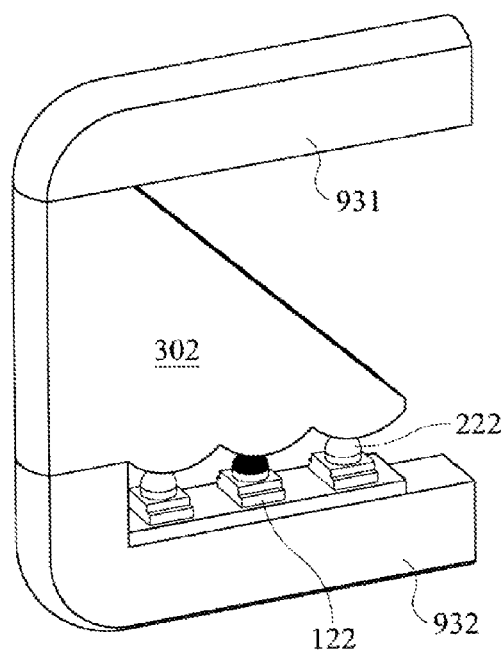
FIGS. 11-13 are simplified diagrams of a touch sensitive slider window having two emitter-detector channels that detect a location of a finger along the height of the window, in accordance with an embodiment of the present invention.
Figure 12:
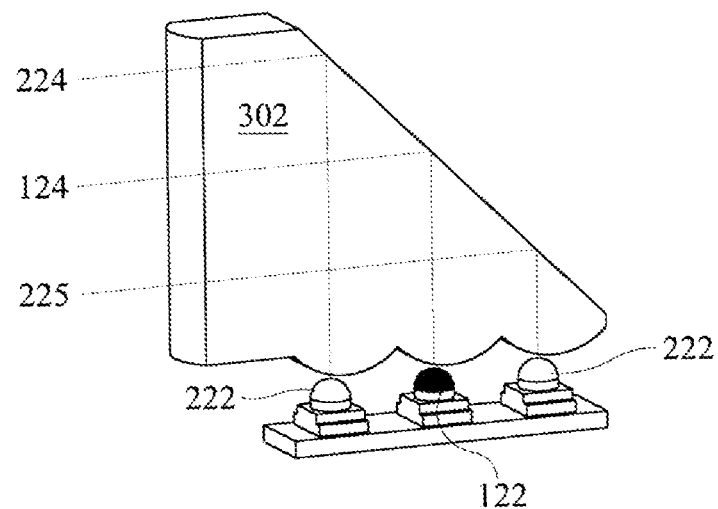
Figure 13:
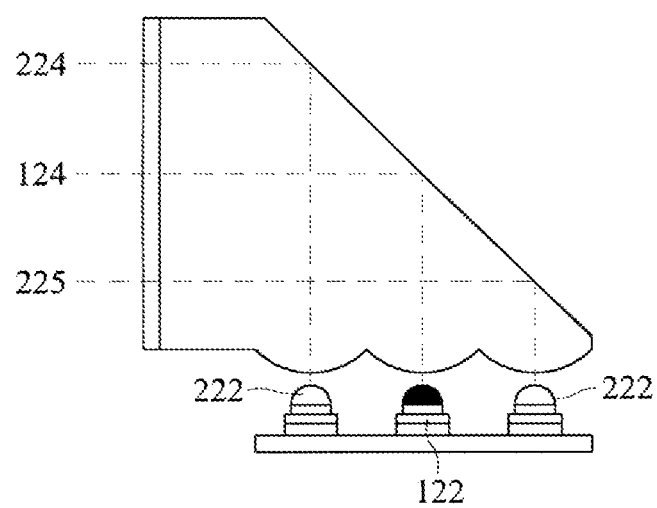

Reference is made to FIGS. 11-13, which are simplified diagrams of a touch sensitive slider window having two emitter-detector channels that detect a location of a finger along the height of the window, in accordance with an embodiment of the present invention. FIGS. 11-13 illustrate another configuration of a two-channel control. In this case, the control detects objects along the height of the device rather than along the length of the device as in FIGS. 3-10. FIGS. 11-13 show upper and lower casing parts 931 and 932. One emitter 122 and two receivers 222 are connected to lower casing part 932. The detection channels are made possible by a reflecting lens 302 inserted between casing parts 931 and 932. The light path from emitter 122 through lens 302 is illustrated in FIG. 12 as outgoing emitter beam 124. The light paths of the two incoming beams 224 and 225 that are directed at the two detectors 222 are also illustrated in FIG. 12. FIG. 13 is a cross-section view of lens 302 and the light beam paths 124, 224 and 225 of FIG. 12.

With three channels, position information in two dimensions is obtained. One application is an optical joystick. A second application is a two-dimensional navigation pad. A third application is a mouse touchpad. For example, arranging three emitters at three corners of an equilateral triangle and placing a detector at the triangle's center of gravity provides three detection signals. By interpolating the signals, a two-dimensional location of the object is obtained. As a second example, begin with the two channels of FIG. 2 to provide height information, and add one channel to provide lateral information as in FIG. 3.

Figure 14:
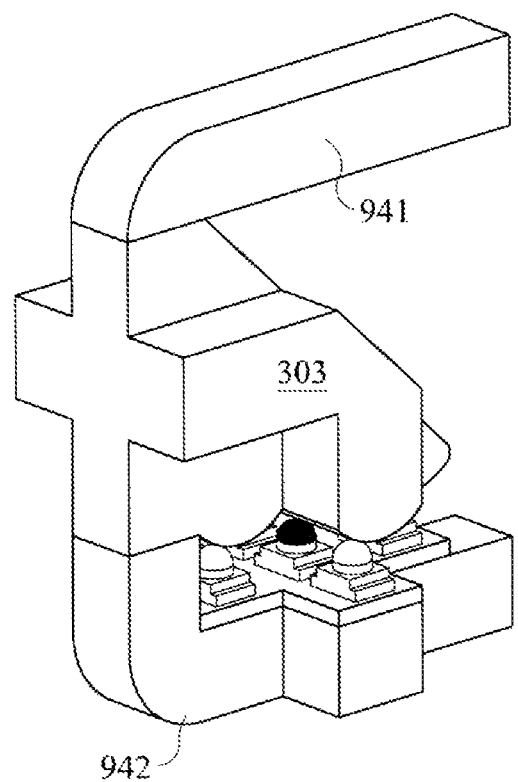
FIGS. 14-17 are simplified diagrams of a configuration of a touch sensitive window having four emitter-detector channels operative to detect a glide movement in both horizontal and vertical directions, in accordance with an embodiment of the present invention.

Reference is made to FIGS. 14-17, which are simplified diagrams of a configuration of a touch sensitive window having four emitter-detector channels operative to detect a glide movement in both horizontal and vertical directions, in accordance with an embodiment of the present invention. FIGS. 14-17 illustrate a cross-bar control for detecting up-down and right-left movements of a finger or other object. The illustrated control has four detection channels created by one central emitter 122 surrounded by four detectors 222.1-222.4. An alternative configuration has one central detector surrounded by four emitters and is similar in operation to the system of FIGS. 14-17. FIG. 14 shows a lens 303 situated between upper and lower casing parts 941 and 942 and the five components (emitters and receivers) mounted inside the device on a PCB (943 in FIG. 16) connected to the lower casing part. An outer cross-shaped surface of lens 303 is flush with the outer casing.

Figure 15:
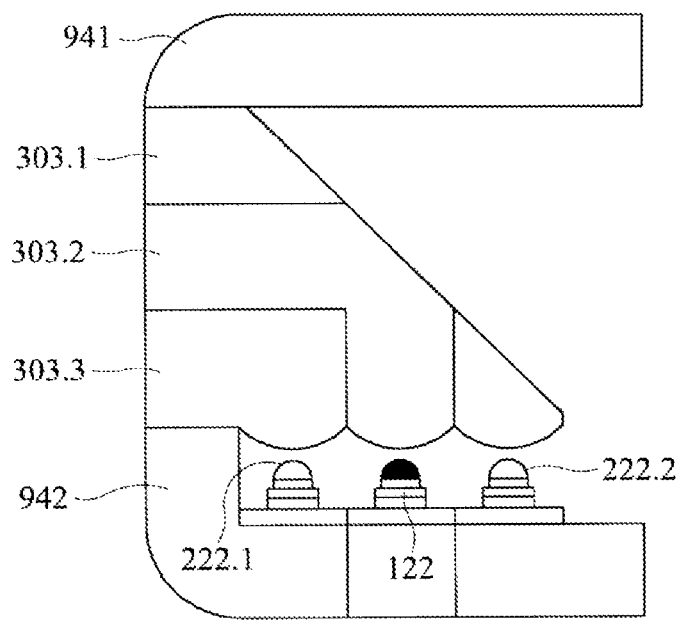

FIG. 15 is a cross-sectional view of the system shown in FIG. 14. Lens 303 is shown divided into sections to illustrate how each section is used by a different component. Detector 222.1 receives light beams that enter the lens through section 303.1; emitter 122 uses section 303.2 to reflect light out of the lens; detector 222.2 receives light beams that enter the lens through section 303.3.

Figure 16:
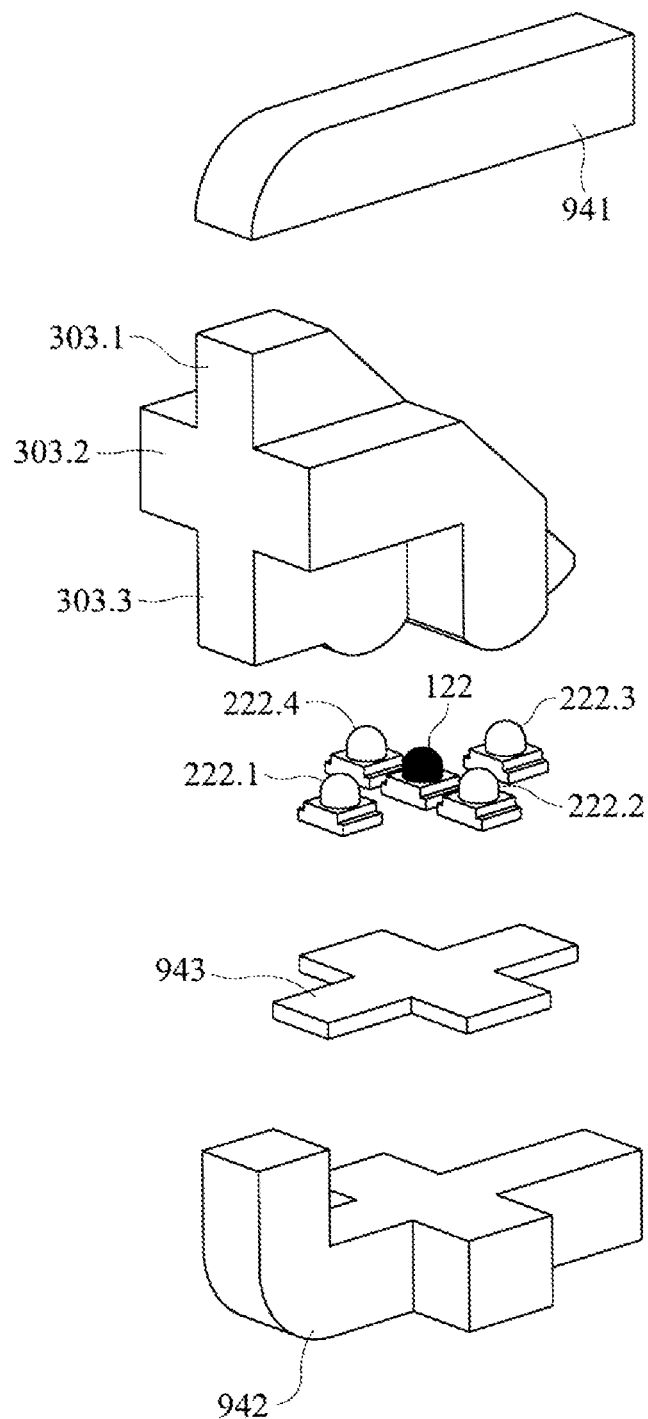

FIG. 16 is an exploded view of the system shown in FIG. 15. FIG. 16 shows detectors 222.1-222.4 and emitter 122; PCB 943; upper and lower casing parts 941 and 942; and lens 303 divided into upper section 303.1, middle section 303.2 and lower section 303.3.

Figure 17:
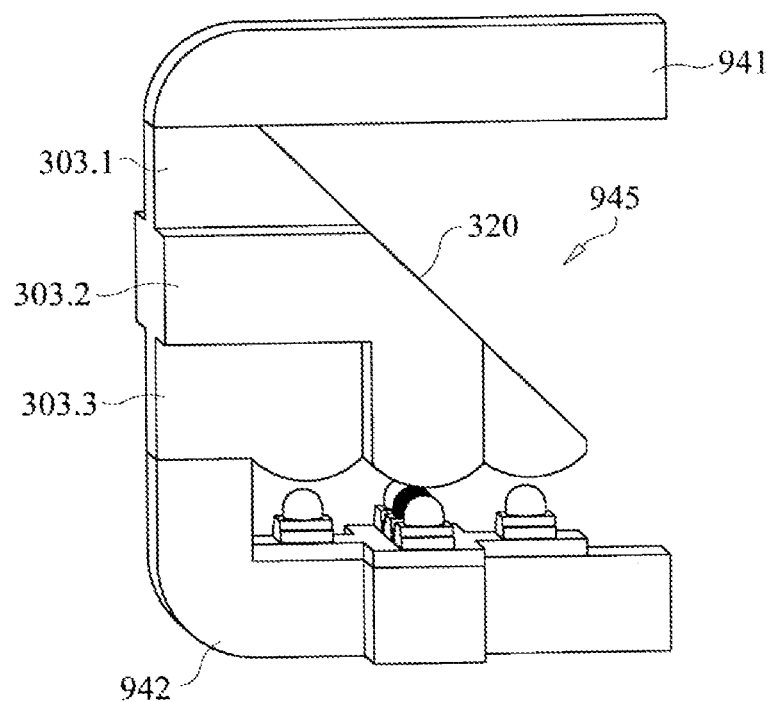

FIG. 17 is a slightly rotated side view of the system of FIG. 16. FIG. 17 illustrates how middle section 303.2 of the lens is used by detectors 222.2 and 222.4 in addition to emitter 122. An air gap 945 behind lens 303 is also shown. The purpose of air gap 945 is to make the diagonal face 320 of lens 303 internally reflective.

Figure 18:
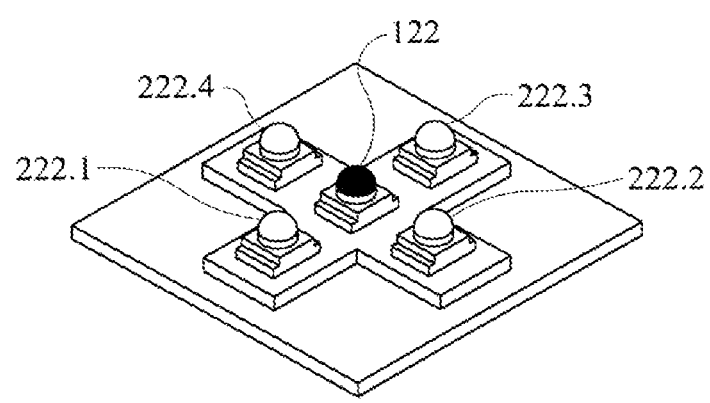
FIGS. 18 and 19 are simplified illustrations of top-shooting diodes in a configuration of a touch sensitive window having four emitter-detector channels operative to detect a glide movement in both horizontal and vertical directions, in accordance with an embodiment of the present invention.
Figure 19:
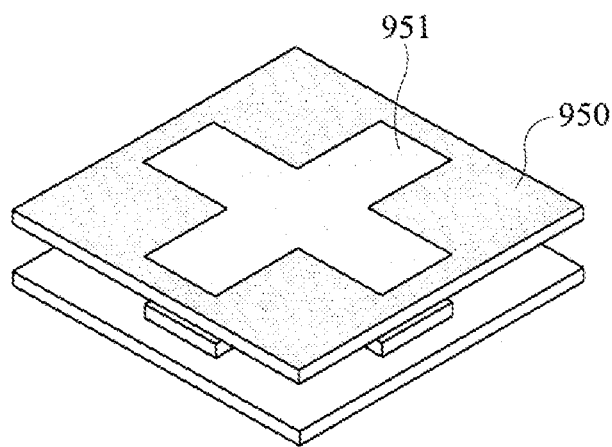

Reference is made to FIGS. 18 and 19, which are simplified illustrations of top-shooting diodes in a configuration of a touch sensitive window having four emitter-detector channels operative to detect a glide movement in both horizontal and vertical directions, in accordance with an embodiment of the present invention. FIGS. 18 and 19 illustrate a mouse pad or other two-dimensional control. This configuration places the emitters and detectors directly beneath the control surface. FIG. 18 shows four receivers 222.1-222.4 surrounding an emitter 122 to provide four channels, substantially similar to those described hereinabove with reference to FIGS. 14-17. In FIG. 19 an infrared light transmissive cover 950 with a cross shape 951 etched thereon is placed above the emitters and receivers. The cross shape indicates navigational paths to the user.

A system with four channels also provides information in three dimensions regarding a proximal object. For example, begin with the two channels of FIG. 2 to provide height information. Add one channel to provide lateral information as in FIG. 3. Add one more channel to provide information in a second lateral dimension, also as in FIG. 3.

FIGS. 20-29 show a touch sensitive control having two detection channels. This control is typically used for tap-activation. The two detection channels detect reflected light from different directions, with a small area of overlap between the channels. When a user touches the control both channels are activated. This two-channel proximity sensor is able to distinguish between light reflected by a touch and light reflected from a distance, because light reflected from a distance is only detected by one of the two channels.

Figure 20:
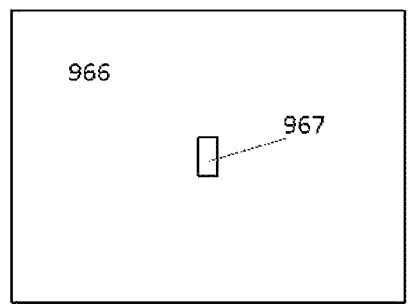
FIG. 20 is a simplified illustration of a single touch sensor on a control panel, in accordance with an embodiment of the present invention.

Reference is made to FIG. 20, which is a simplified illustration of a single touch sensor on a control panel, in accordance with an embodiment of the present invention. FIG. 20 shows a top view of a portion of touch panel 966 having touch control 967 at its center.

Figure 21:
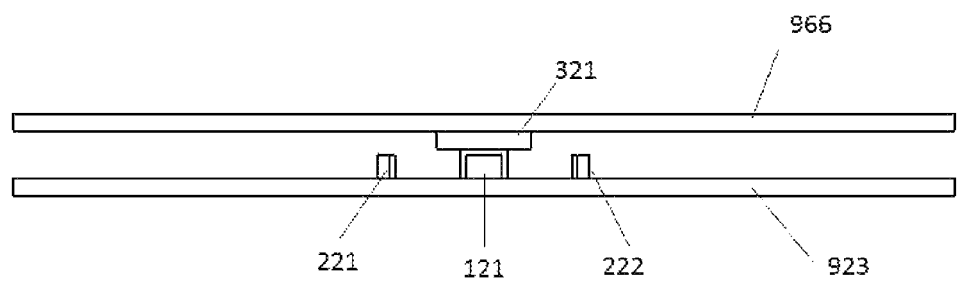
FIGS. 21-23 are simplified cutaway profile views of a touch sensor in a control panel, in accordance with an embodiment of the present invention.
Figure 22:
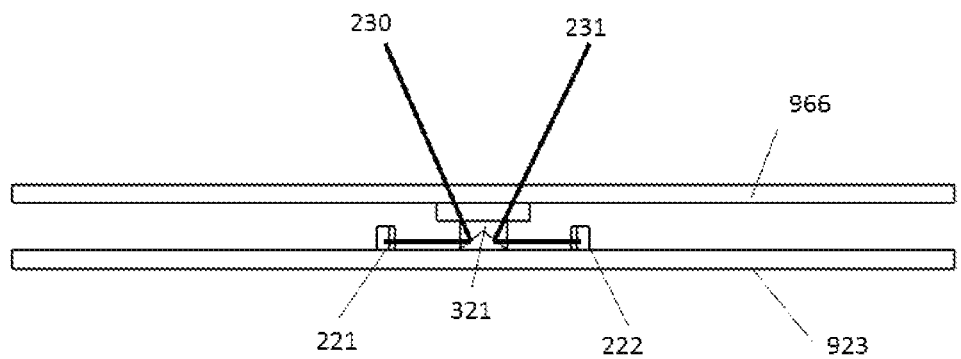
Figure 23:
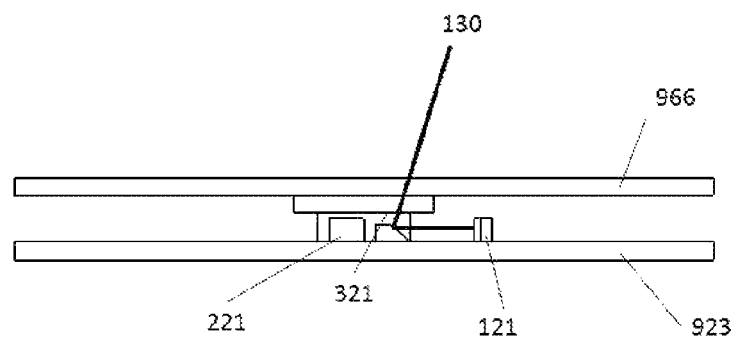

Reference is made to FIGS. 21-23, which are simplified cutaway profile views of a touch sensor in a control panel, in accordance with an embodiment of the present invention. FIG. 21 shows a first side view of touch panel 966 and PCB 923. One light emitter 121, two light detectors 221 and 222, and light guide element 321, are mounted on PCB 923 beneath touch panel 966. An upper surface of light guide 321 is exposed at control 967, not shown in FIG. 21. The current disclosure uses an embodiment of one light emitter and two light detectors. However other configurations, such as (a) one light detector and two light emitters, or (b) more than two detection channels, are also within the scope of the present invention.

FIG. 22 shows a second side view of touch panel 966 and PCB 923. The viewpoints in FIGS. 21 and 22 are from opposite edges of touch panel 966. From the viewpoint of FIG. 22 two light detectors 221 and 222 and light guide element 321, are visible; light emitter 121 of FIG. 21 is blocked from view in FIG. 22 by light guide element 321. From the viewpoint of FIG. 22 two diagonal reflective facets are visible on the underside of light guide 321. These direct divergent incoming beams 230 and 231 onto light detectors 221 and 222, respectively. Thus, when light is reflected onto touch control 967 from a distance, e.g., by a shiny object such as a user's jewelry, only one of the detectors will detect the light. At the very least, there will be a significant difference in the amount of light detected at the two detectors. This difference indicates a false detection. In other words, the system detects a touch only when both detectors 221 and 222 detect similar amounts of reflected light. This occurs when the user's finger touches, or is very close to, touch control 967 and reflects light in many directions inside the light guide.

FIG. 23 shows a third side view of touch panel 966 and PCB 923. From the viewpoint of FIG. 23 light emitter 121, one light detector 221 and light guide element 321 are visible; the second light detector 222 of FIGS. 21 and 22 is blocked from view in FIG. 23 by light guide element 321. From the viewpoint of FIG. 23 a diagonal reflective facet is visible on the underside of light guide 321 that directs light beam 130 from emitter 121 out above touch control 967. Light beam 130 is projected at an angle that is divergent from the incoming angles of reflected beams 230 and 231. In FIG. 23, light beam 130 is projected at an angle above touch control 967, not at 90° to the touch panel 966. This further reduces the likelihood that a distant reflective object will reflect beam 130 back onto touch control 967 in a manner that the reflected beam will be equally detected at both detectors 230 and 231. Thus, touch detection is characterized by equal detections of reflected emitter beam 130 at both detectors 221 and 222, and occurs only when the user's finger touches, or is very close to, touch control 967.

Figure 24:
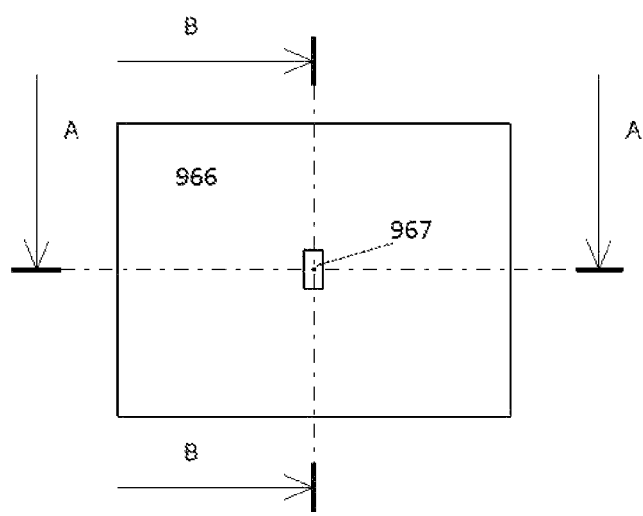
FIGS. 24-26 are simplified cross-sectional views of a touch sensor in a control panel, in accordance with an embodiment of the present invention.
Figure 25:
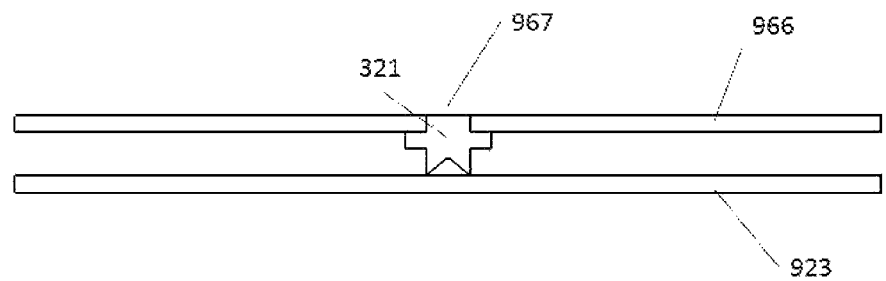
Figure 26:
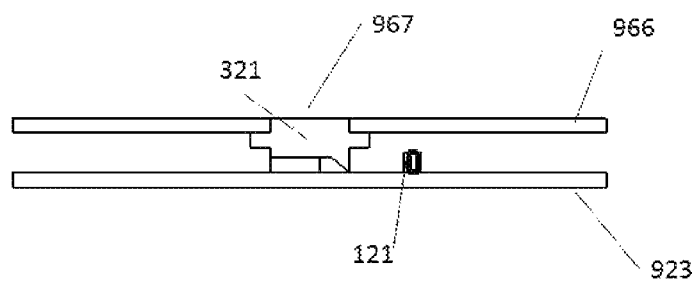

Reference is made to FIGS. 24-26, which are simplified cross-sectional views of a touch sensor in a control panel, in accordance with an embodiment of the present invention. FIG. 24 shows the touch panel of FIG. 20 with cross sections A-A and B-B. Cross section A-A is shown in FIG. 25, and cross section B-B is shown in FIG. 26. Both FIGS. 25 and 26 illustrate how an upper surface of light guide 321 is exposed at touch control 967.

Figure 27:
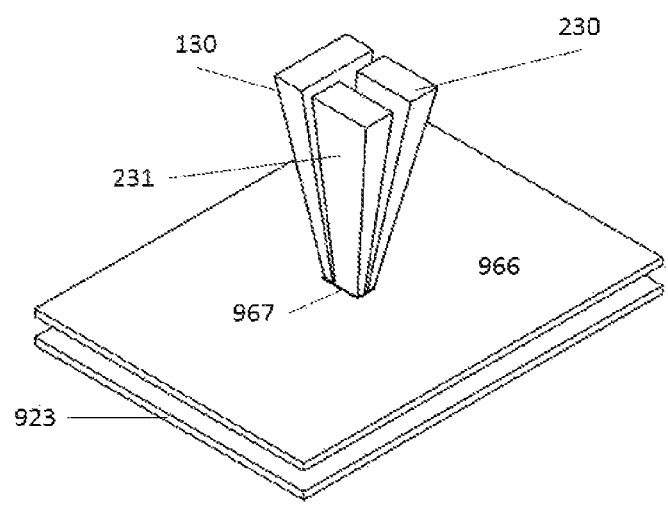
FIGS. 27 and 28 are simplified illustrations of emitter and receiver light beams for a multi-channel touch sensor, in accordance with an embodiment of the present invention.
Figure 28:
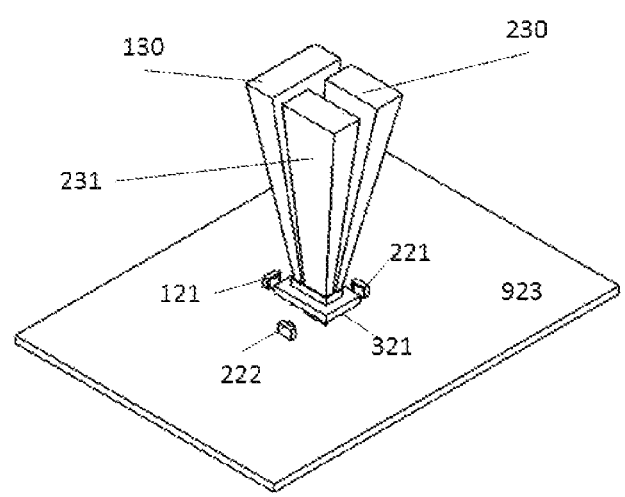

Reference is made to FIGS. 27 and 28, which are simplified illustrations of emitter and receiver light beams for a multi-channel touch sensor, in accordance with an embodiment of the present invention. The two detection channels of this proximity sensor are shown in FIGS. 27 and 28 by emitter beam 130 and two detector channels 230 and 231. The term "detector channel" refers to a detectable reflected beam. FIG. 27 shows emitter beam 130 and two detector channels 230 and 231 above touch control 967. In FIG. 28, touch panel 966 has been removed exposing light guide 321 emitter 121 and detectors 221 and 222 on PCB 923.

Figure 29:
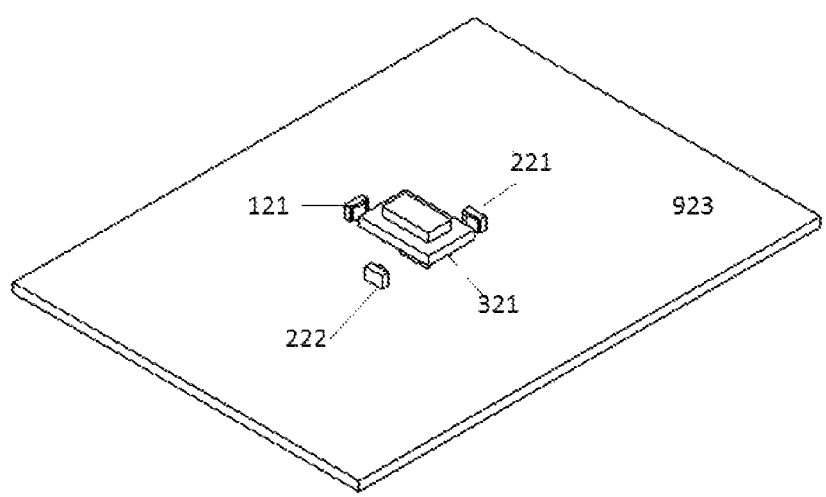
FIG. 29 is a simplified illustration of touch sensor components arranged on a substrate or printed circuit board (PCB), in accordance with an embodiment of the present invention.

Reference is made to FIG. 29, which is a simplified illustration of touch sensor components arranged on a substrate or printed circuit board (PCB), in accordance with an embodiment of the present invention. FIG. 29 shows light guide 321 emitter 121 and detectors 221 and 222 on PCB 923. Emitter beam 130 and detector channels 230 and 231 diverge to a lesser degree in FIGS. 27 and 28 than those illustrated in FIGS. 22 and 23.

Figure 30:
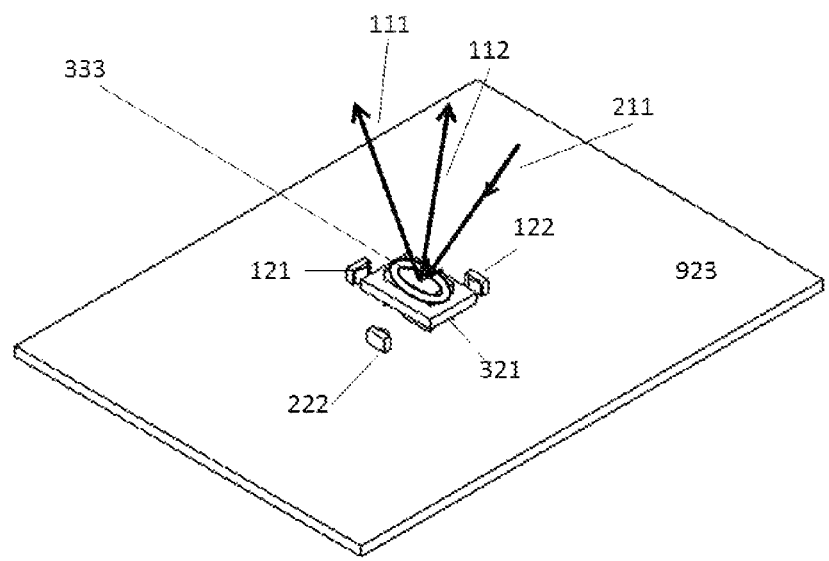
FIG. 30 is a simplified illustration of a multi-channel touch sensor, in accordance with an embodiment of the present invention.

Reference is made to FIG. 30, which is a simplified illustration of a multi-channel touch sensor, in accordance with an embodiment of the present invention. Shown in FIG. 30 is light guide 321 surrounded on three sides by emitters 121 and 122, and receiver 222. An aperture 333 at the center of light guide 321 is the exposed portion of the touch sensor when the sensor is mounted in a device. Light guide 321 is configured so that light from each of the emitters exits through aperture 333 at a different angle. Thus, light beam 111 from emitter 121 exits aperture 333 at a first angle, and light beam 112 from emitter 122 exits aperture 333 at a second angle, divergent from the first angle. Light guide 321 is also configured so that light directed to receiver 222 enters aperture 333 at a third angle, different than the angles that beams 111 and 112 exit aperture 333. Thus, light beam 211 enters aperture 333 at a third angle. All of the components are mounted on PCB 923. In some embodiments, none of the angles are 90° with respect to the aperture.

Figure 31:
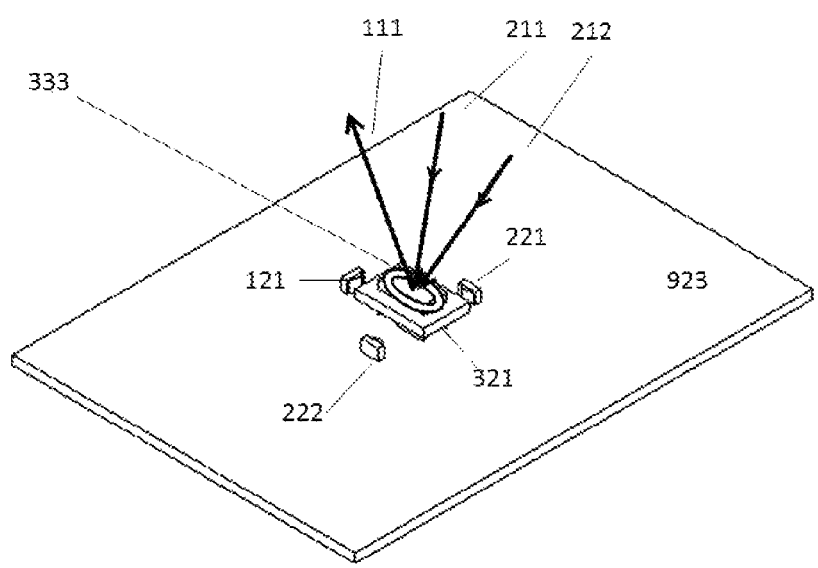
FIG. 31 is a simplified illustration of a multi-channel touch sensor, in accordance with an embodiment of the present invention.

Reference is made to FIG. 31, which is a simplified illustration of a multi-channel touch sensor, in accordance with an embodiment of the present invention. The touch sensor of FIG. 31 is similar to that of FIG. 30, except that in FIG. 30 the two detection channels are formed by one emitter and two receivers. Shown in FIG. 31 is light guide 321 surrounded on three sides by receivers 221 and 222, and emitter 121. In this case the three divergent light beams entering and exiting aperture 333 are emitter beam 111 and receiver beams 211 and 212.

Figure 32:
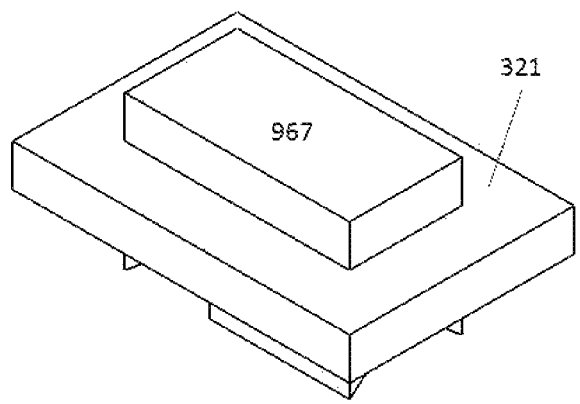
FIGS. 32-34 are rotated views of a lens element used in multi-channel touch sensors and proximity sensors, in accordance with an embodiment of the present invention.
Figure 33:
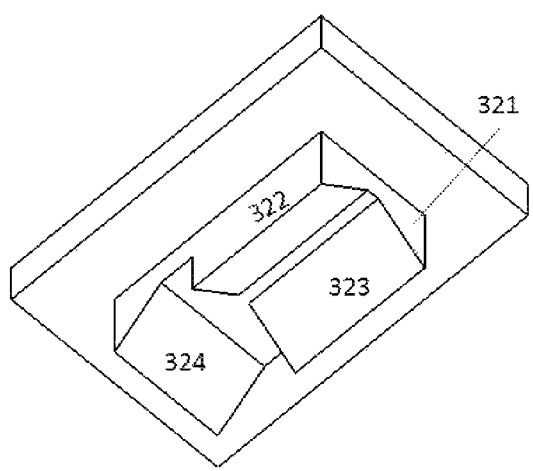
Figure 34:
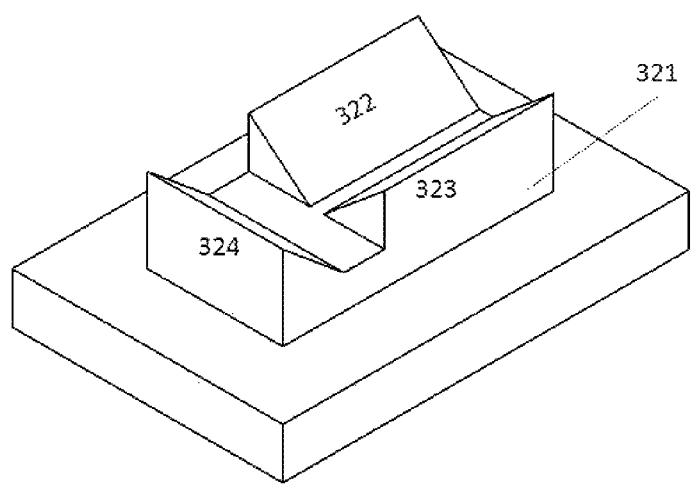

Reference is made to FIGS. 32-34, which are rotated views of a lens element used in multi-channel touch sensors and proximity sensors, in accordance with an embodiment of the present invention.

FIGS. 32-34 are three-dimensional views of light guide element 321 alone. FIG. 32 shows a view of light guide element 321 from the top, showing the surface exposed through control 967. FIG. 33 shows a view of light guide element 321 from below. In this view, three reflective wedges 322, 323 and 324 are shown. Light enters each wedge and is reflected by the wedge's diagonal facet as illustrated by beams 130, 230 and 231 in FIGS. 22, 23, 27 and 28. When mounted on PCB 923, wedge 324 is situated opposite light emitter 121 to reflect and project emitter beam 130 in FIGS. 23, 27 and 28; and wedges 322 and 323 are situated opposite detectors 221 and 222, respectively, to create detection channels 230 and 231 in FIGS. 21, 27 and 28. In FIG. 34, light guide element 321 has been turned upside down, showing reflective wedges 322-324 prominently.

White Goods User Interfaces (UIs)

Aspects of the present invention relate to user interfaces (UI) for household appliances. This section describes user interfaces for stoves, refrigerators, ovens and washing machines.

I. Cooktop UI

Figure 35:
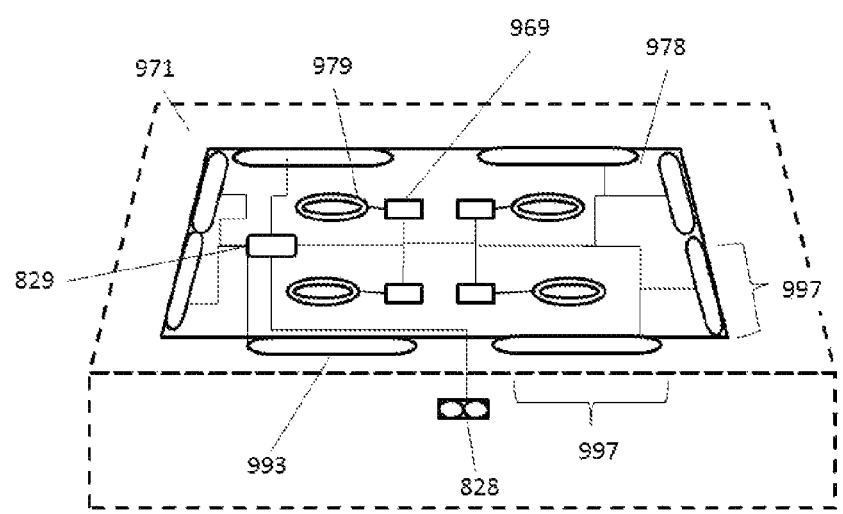
FIG. 35 is a simplified illustration of a cooktop with illumination, in accordance with an embodiment of the present invention.

Reference is made to FIG. 35, which is a simplified illustration of a cooktop with illumination, in accordance with an embodiment of the present invention. Shown in FIG. 35 is a surface 978 on which to place pots containing food to be heated. The cooktop is mounted in counter 971. A plurality of heating elements 979 and their corresponding control circuits 969 are situated underneath surface 978. The heating elements are used to heat the food in the pots. FIG. 35 shows that each heating element 979 is associated with two respective sections 997 of one or more edges of surface 978. Light sources 993 are situated underneath surface 978 along its edges. Proximity sensor 828 faces the airspace in front of the cooktop. When a person approaching the cooktop is detected by proximity sensor 828, an indication of this detection is transmitted to processor 829 which, in response thereto, activates light sources 993 creating a visible glow along the edges of surface 978.

Figure 36:
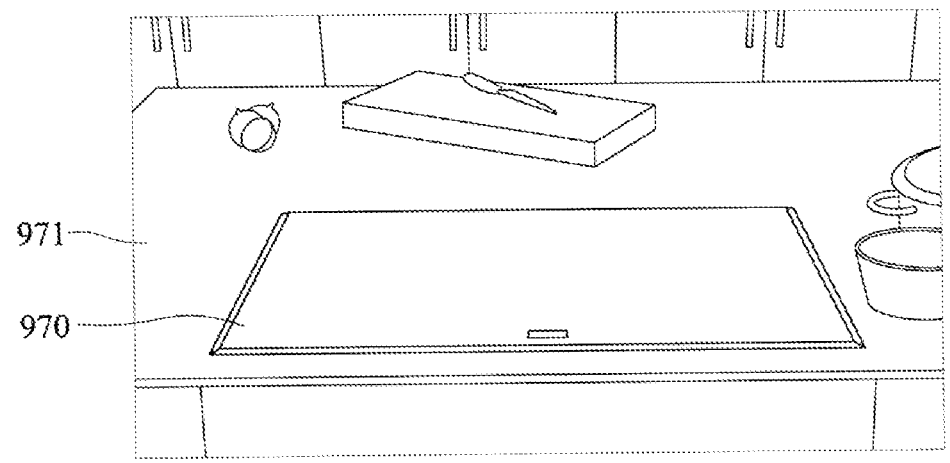
FIGS. 36-41 are simplified illustrations of a user interface for a cooktop, in accordance with an embodiment of the present invention.

Reference is made to FIGS. 36-41, which are simplified illustrations of a user interface for a cooktop, in accordance with an embodiment of the present invention. FIG. 36 shows an induction cooktop 970 having one or more electromagnets sealed beneath a heat-resisting glass-ceramic sheet. Cooktop 970 is embedded in kitchen counter 971. When the cooktop is not in use it is muted, as all indications and markings disappear. As explained in detail hereinbelow, this is a subtle cooktop UI that senses and reacts to user needs, contextually.

Figure 37:
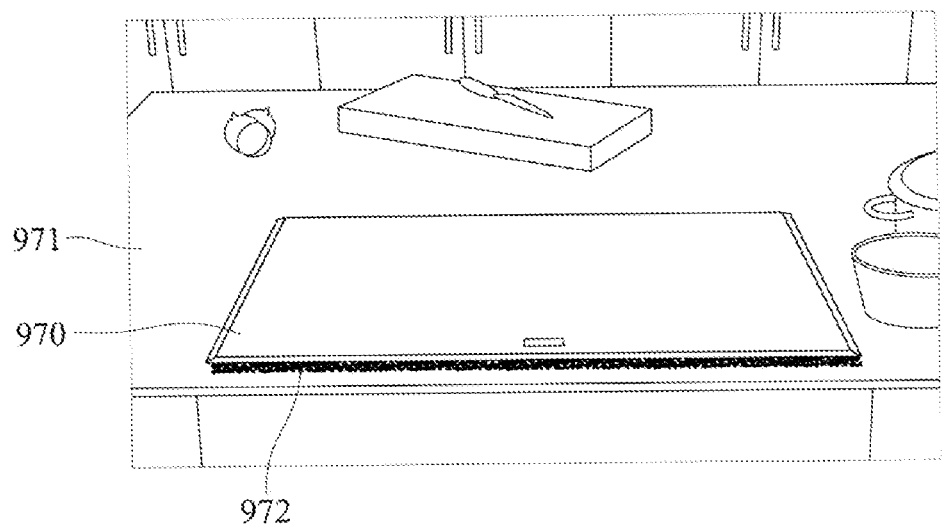

The cooktop ceramic sheet has arrays of lenses along each of its edges. These lenses are coupled to visible-light emitting diodes to create a steady radiance of light or glow along the cooktop edges that signals the state of the cooktop to the user. In addition, the lenses along the forward-facing edge of the cooktop are also coupled to near-infrared emitters and detectors to provide proximity detection of an approaching user and of user gestures. Thus when a user approaches the cooktop, the cooktop emits a visible glow along its edges indicating that it has "woken up" and is waiting for user input. Such a visible glow 972 along the forward-facing edge of cooktop 970 is shown in FIG. 37.

Figure 38:
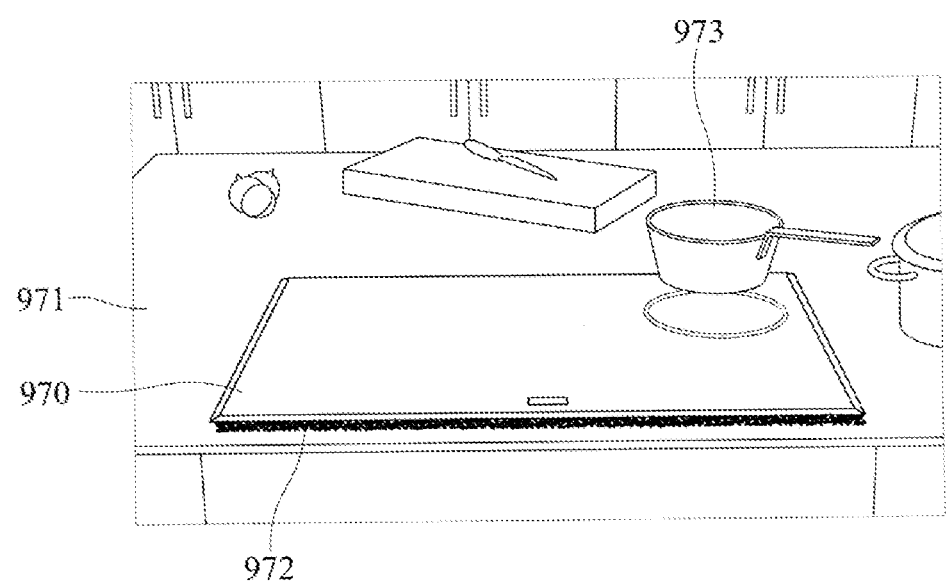
Figure 39:
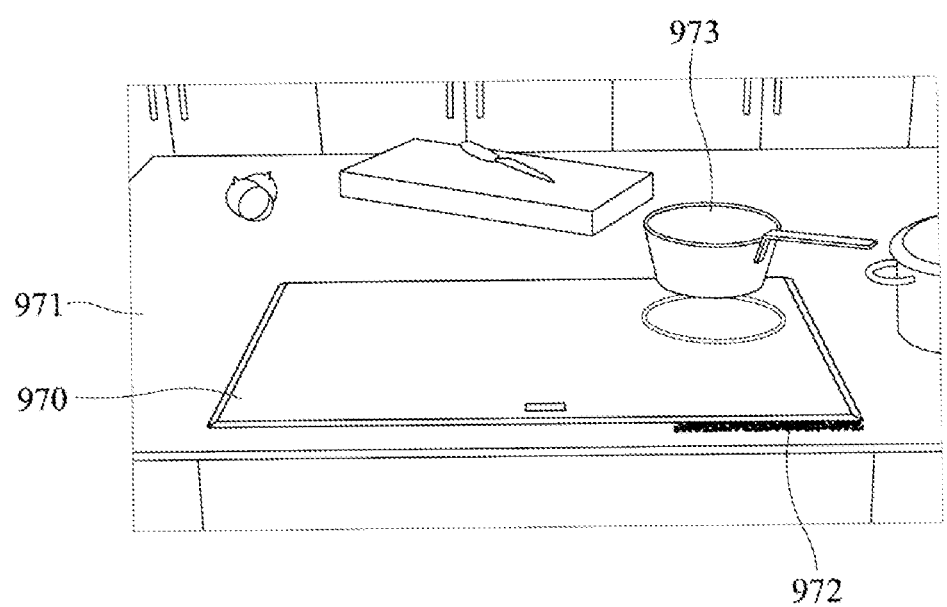
Figure 40:
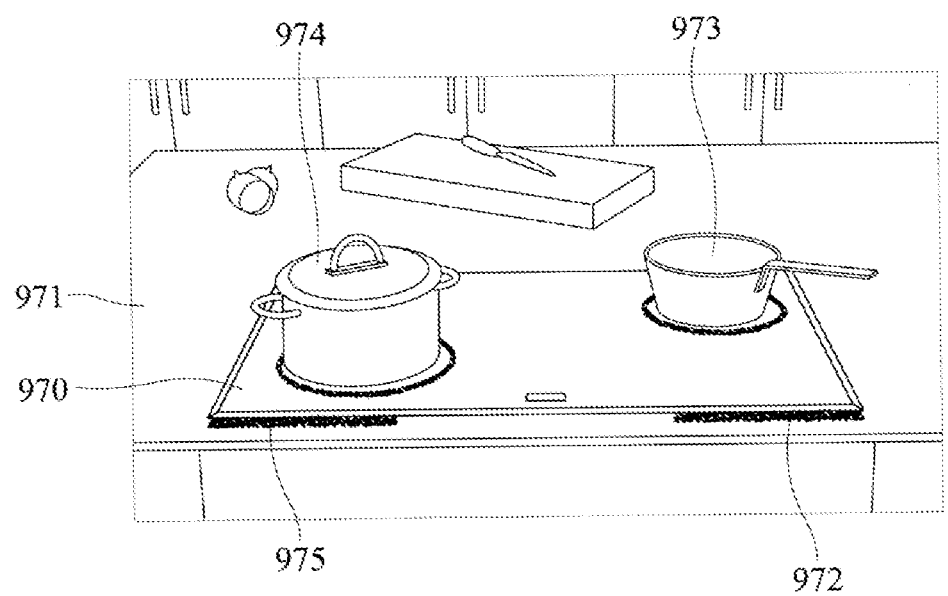

Additional proximity sensors are placed beneath each of the cooktop burners to detect a pot or pan being lowered over the burner. Alternatively, light beams are projected from the edges of the cooktop across the cooktop burners to detect a pot or pan being lowered over the burner and thereby blocking the light beams that traverse the burner. When pots and pans are held over the cooking surface, a visible glow along the cooktop edges guides the user as he places the pot or pan onto the cooktop, as shown in FIGS. 38 and 39. FIG. 38 shows saucepan 973 is hovering above cooktop surface 970. Visible glow 972 appears along the edge of cooktop 970. Alternatively, and as shown in FIG. 39, only a portion of the cooktop edge corresponding to the burner beneath the hovering saucepan is illuminated to guide the user as he sets the saucepan down. FIG. 39 shows how, once saucepan 973 is set down on a cooktop burner, a segmented interaction area lights up 972 along the borders of the cooktop, corresponding to the burner beneath the saucepan. This lit-up segment is an input control for configuring the heating element beneath the saucepan. In its lit-up state the segment is ready for receiving user input. The user does not need to separately turn on the cooktop controls as is typically required in prior art cooktops. In accordance with embodiments of the present invention, detection of the saucepan places the control into an active mode ready to receive user input. FIG. 40 shows that several interaction areas are indicated by illuminated borders depending on active cooking zones. Thus, in FIG. 40 illuminations 972 and 975 indicate active areas on cooktop 970 at which saucepan 973 and pot 974 have been placed.

Figure 41:
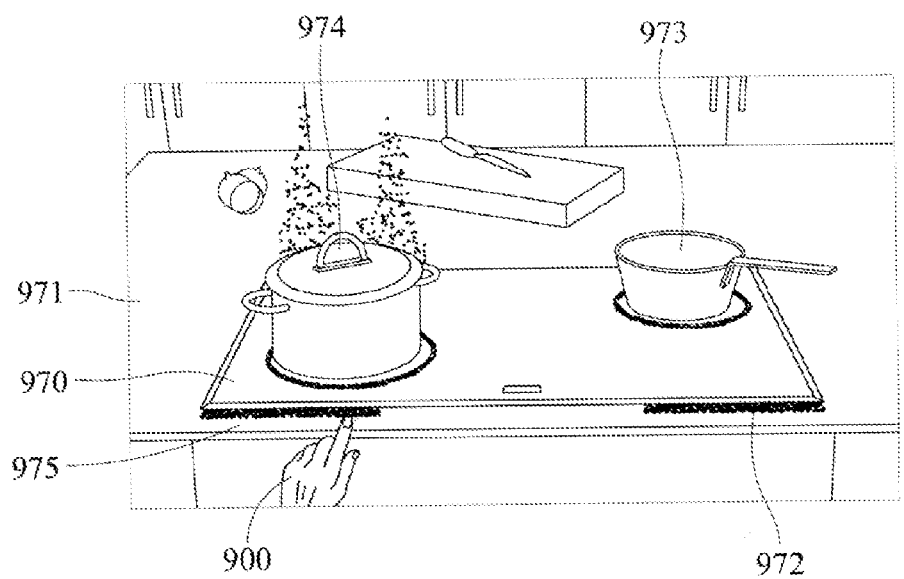

The user adjusts the heat on an active burner by gliding his finger along the burner's corresponding illuminated border segment. FIG. 41 shows a user finger 900 gliding from left to right along illuminated segment 975 to increase the heat under pot 974. The light intensity of the illuminated segment increases as the temperature setting increases. This provides intuitive feedback to the user.

Figure 42:
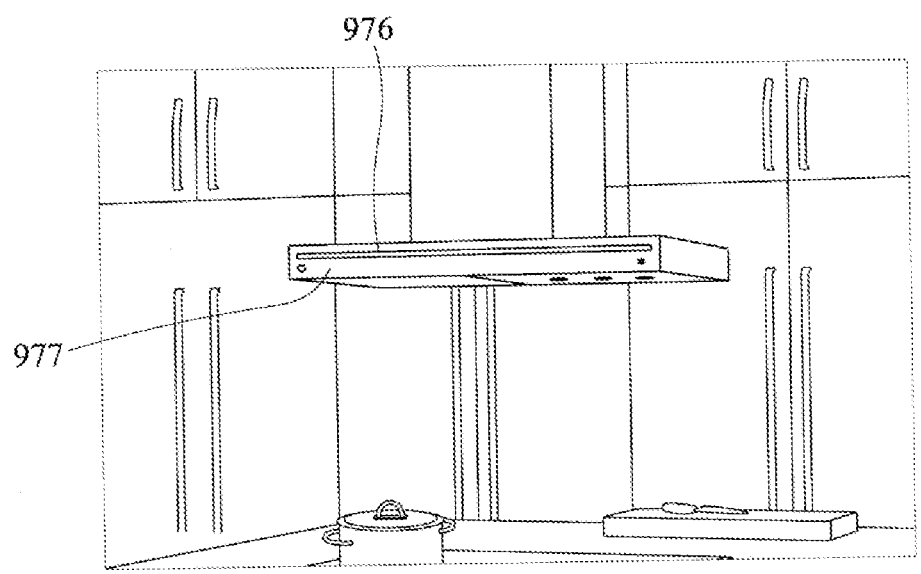
FIGS. 42 and 43 are simplified illustrations of a cooktop user interface placed in the cooktop exhaust hood, in accordance with an embodiment of the present invention.
Figure 43:
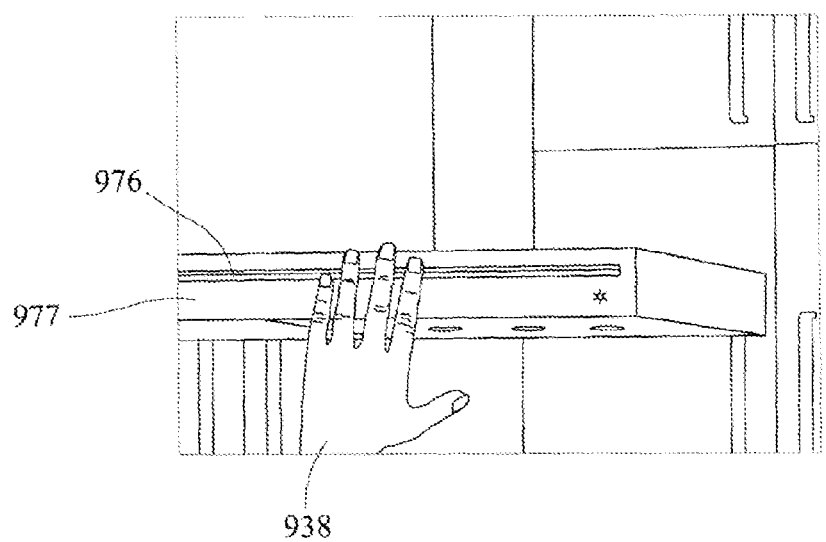

Reference is made to FIGS. 42 and 43, which are simplified illustrations of a cooktop user interface placed in the cooktop exhaust hood, in accordance with an embodiment of the present invention. In FIG. 42 temperature control 976 is realized as a proximity sensor strip placed along a surface of exhaust hood 977 above cooktop 970. FIG. 43 shows that a user can adjust the temperature setting by waving his hand 938 along the temperature control strip 976 without touching the strip. An array of proximity sensors in the strip detects the position of the user's hand when it hovers at a distance of a few centimeters away from the strip. Thus, no direct touch is needed, and this keeps the surfaces and hands clean.

II. Oven and Stove UI

Figure 44:
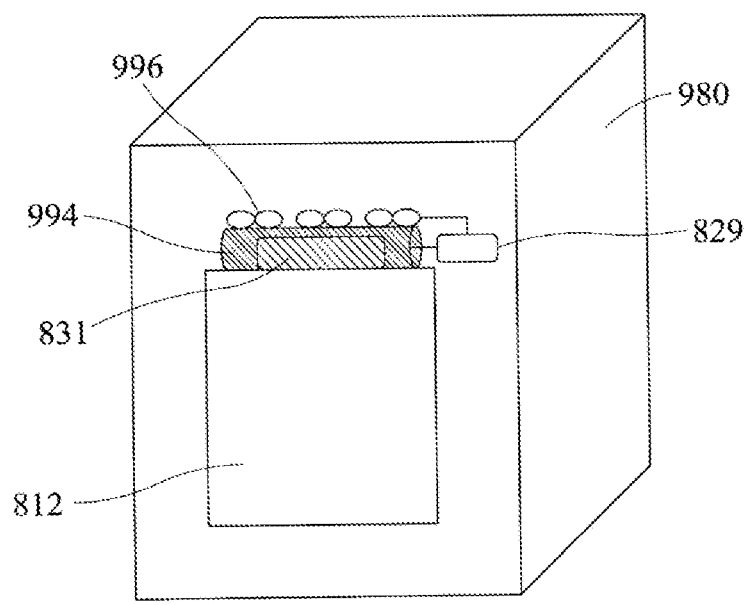
FIG. 44 is a simplified illustration of an appliance, e.g., an oven, with an illuminated cylindrical control panel, in accordance with an embodiment of the present invention.

This section describes three appliance UI control panels. The present description mentions ovens as an example appliance into which the UI panels are incorporated, but other appliances are also within the scope of the present invention. Reference is made to FIG. 44, which is a simplified illustration of an appliance, e.g., an oven, with an illuminated cylindrical control panel, in accordance with an embodiment of the present invention. Shown in FIG. 44 is oven 980 having a hollow compartment for storing food items to be cooked, and oven door 812 for opening and closing this compartment. Just above door 812 is a control panel featuring display 831 mounted behind transparent cylindrical panel 994. An array of proximity sensors 996 is mounted above panel 994 for detecting nearby objects and for detecting user gestures performed on the exposed cylindrical surface of panel 994. Processor 829 receives outputs from proximity sensors 996, which indicate user gestures, and presents information on display 831 in response to the user gestures.

Figure 45:
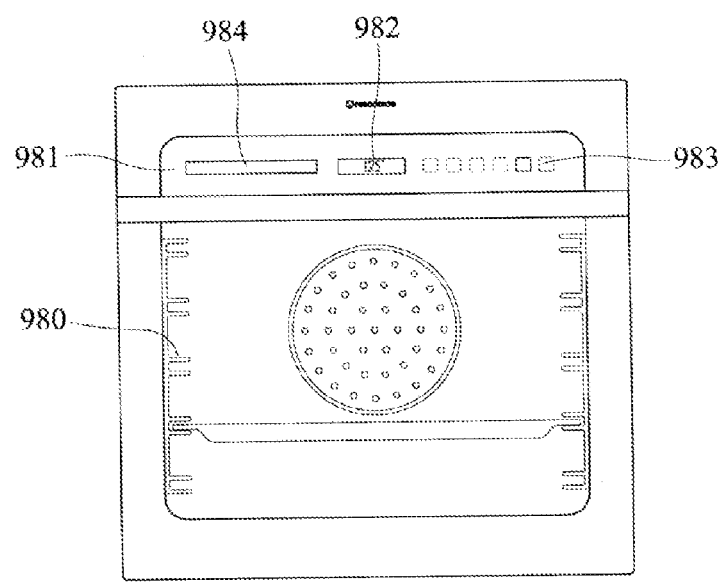
FIGS. 45-52 are simplified illustrations of a user interface for an oven, in accordance with an embodiment of the present invention.

Reference is made to FIGS. 45-52, which are simplified illustrations of a user interface for an oven, in accordance with an embodiment of the present invention. FIG. 45 shows an oven 980 having a first UI panel 981 above the over door. The UI panel has two, touch-sensitive sections separated by digital clock 982. To the right of clock 982 are touch-sensitive static icons 983 for selecting oven element configuration, e.g., roast/bake/grill. To the left of clock 982 is slider groove 984 for adjusting values, e.g., oven temperature. The user glides his finger along groove 984 to raise or reduce the oven temperature, or to set the time.

This first oven UI panel can be realized in several ways. In some embodiments, proximity sensors are placed underneath icons 983 and slider control 984. In other embodiments, a row of proximity sensors is situated along the upper or lower edge of UI panel 981 that detect a finger inserted onto the panel. In other embodiments, emitters along an edge of control panel 981 send light beams across control panel 981 to respective detectors along the opposite edge of control panel 981. An inserted finger touching a control blocks one or more emitter beams from reaching corresponding one or more detectors. In some embodiments where detection is based on the absence of expected light, the emitters are arranged as a one-dimensional array along the top of control panel 981 and the detectors are arranged as a one-dimensional array along the bottom of control panel 981. This provides detection in only one dimension, namely, along the length of the control panel 981. As such, the controls are distributed along the length of control panel 981.

Figure 46:
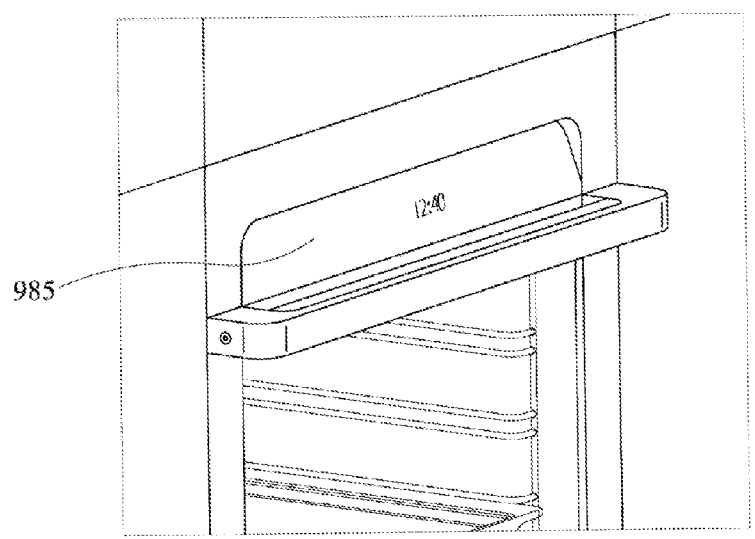

A second oven UI panel is illustrated in FIG. 46, which shows a convex, curved control panel 985 above the over door. This convex panel is transparent and cylindrical. Beneath the panel, illuminated controls appear as described below. In FIG. 46, a clock is displayed on panel 985. An array of proximity sensors is situated along the upper edge of this panel and aimed along the panel's curved surface to detect hand gestures performed on the panel.

Figure 47:
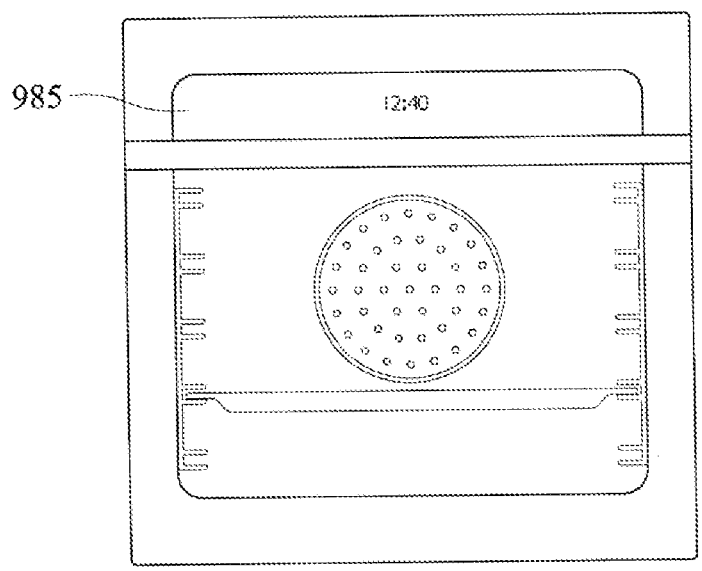
Figure 48:
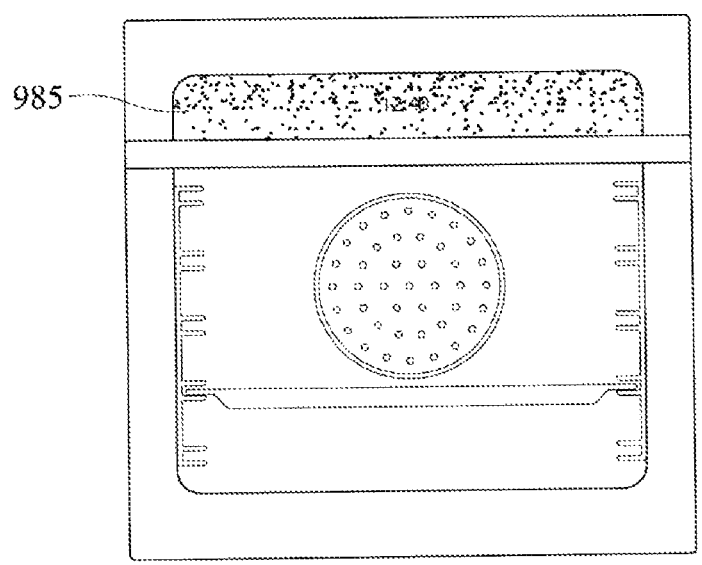
Figure 49:
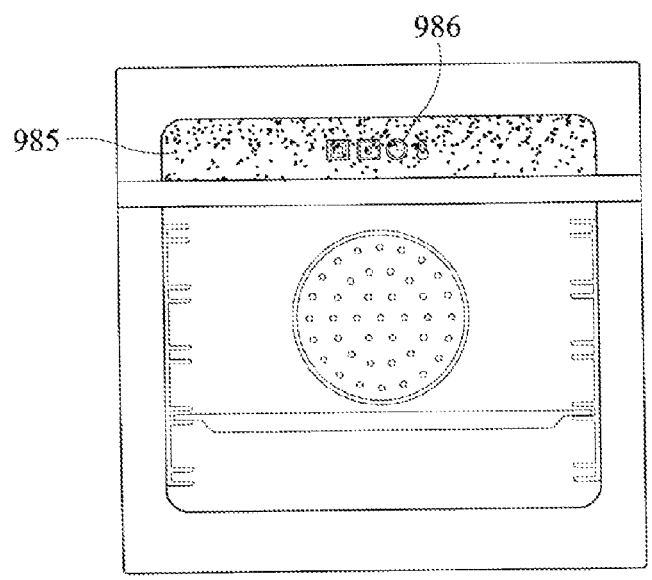
Figure 50:
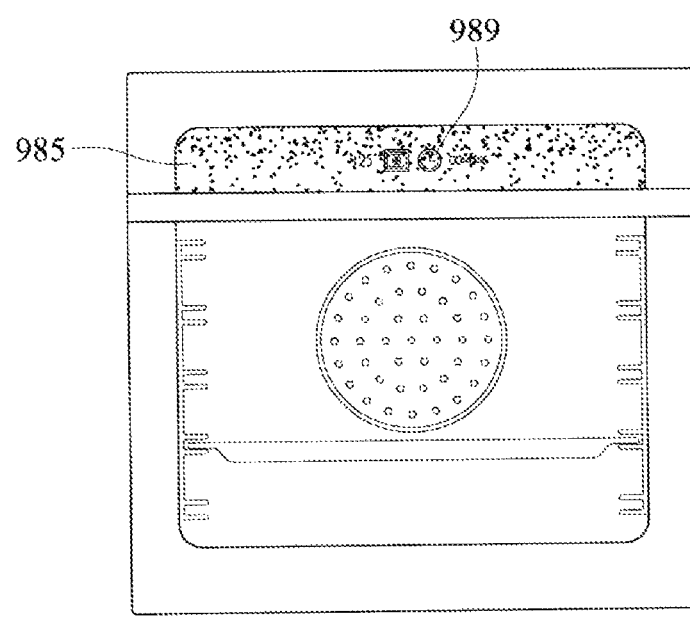

As in the first oven UI panel, when the UI is not in use the panel is clean and muted. FIG. 47 shows this state in which panel 985 is dark except for a digital clock displayed at its center. When a user approaches the oven, panel 985 is illuminated with a radiant glow as illustrated in FIG. 48. The approaching user is detected by forward-facing proximity sensors above, near, or behind, panel 985. When a user's hand nears panel 985, as detected by an array of proximity sensors along the panel's front edge, user control icons 986 appear on panel 985, as shown in FIG. 49. When the oven is in use, the display provides an overview of current oven settings 989 and also allows quick access to adjust any setting directly, as shown in FIG. 50.

Figure 51:
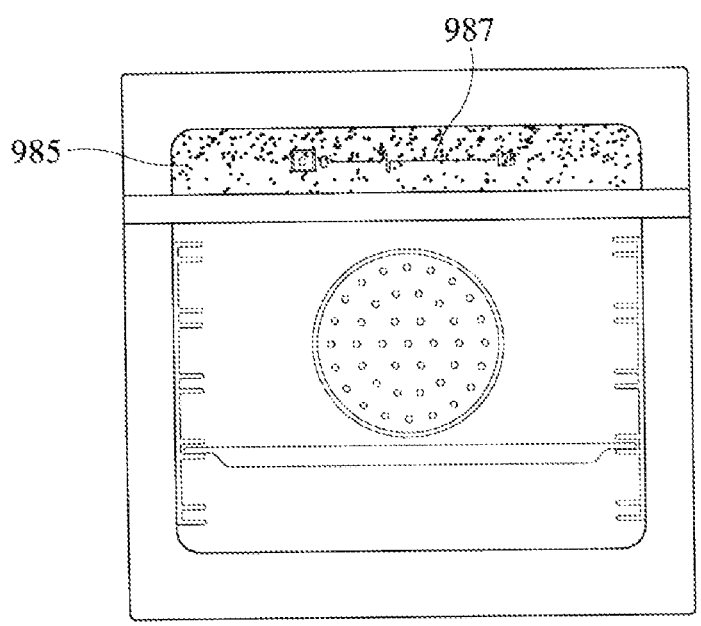
Figure 52:
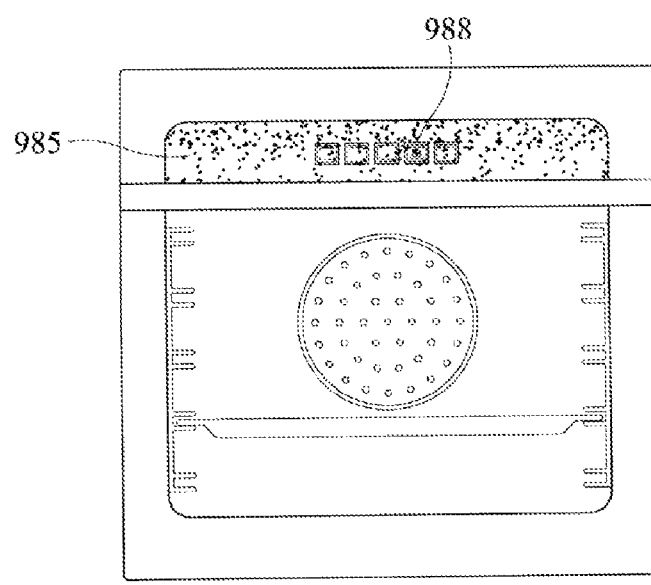

Both sweep gestures and tap gestures are enabled on panel 985. The user taps on one of icons 986 of FIG. 49 or oven settings 989 of FIG. 50 to open a control for configuring the parameter associated with the selected icon or setting. Parameters such as oven temperature and setting the time are adjusted using a graphic slider bar 987 that the user manipulates by sweeping his finger along the slider graphic. Slider bar 987 is shown in FIG. 51. Other parameters are configured using button controls 988, as shown in FIG. 52.

Figure 53:
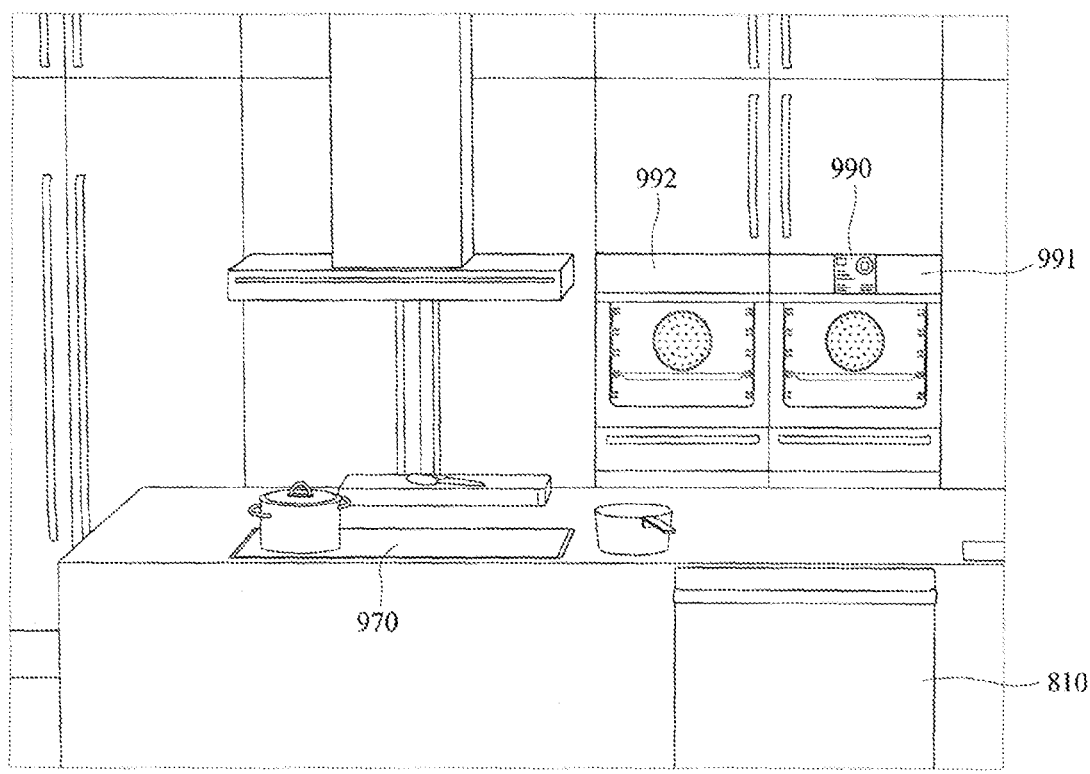
FIGS. 53-58 are simplified illustrations of a centralized wireless hub for controlling multiple while good appliances in a home, in accordance with an embodiment of the present invention.
Figure 54:
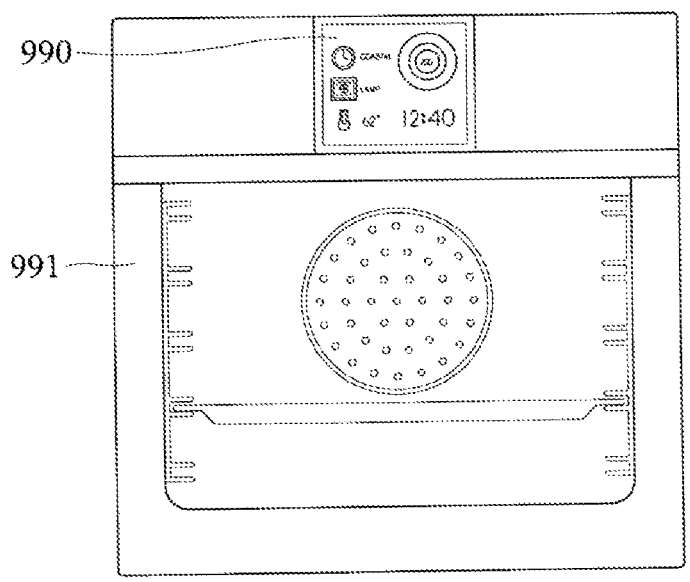
Figure 55:
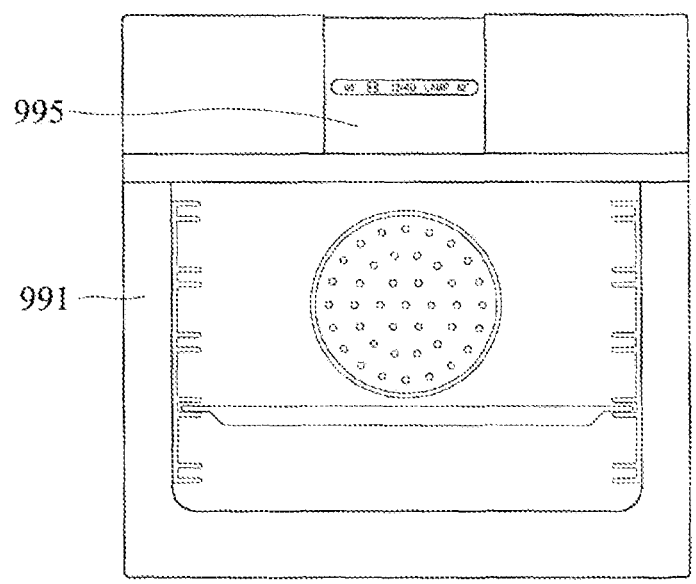
Figure 56:
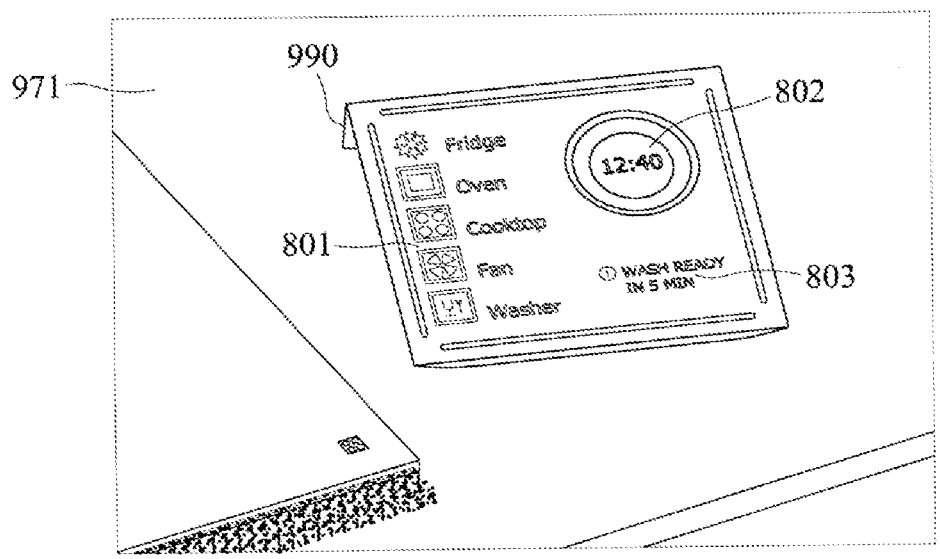

Reference is made to FIGS. 53-58, which are simplified illustrations of a centralized wireless hub for controlling multiple white good appliances in a home, in accordance with an embodiment of the present invention. A third oven UI is shown in FIG. 53. FIG. 53 shows a central control hub 990 for controlling multiple kitchen appliances, such as ovens 991 and 992, cooktop 970 and dishwasher 810. Hub 990 can be inserted into a socket 995 (shown in FIG. 55) above oven 991, or removed from socket 995 and placed on a kitchen counter. By enclosing light-based touch sensors in an airtight sealed housing that includes infrared transmissible portions, hub 990 can be made waterproof. FIG. 54 shows hub 990 in socket 995; FIG. 55 shows socket 995 without hub 990; and FIG. 56 shows hub 990 on kitchen counter 971. FIG. 56 shows hub 990 displaying an array of appliance icons 801 monitored by hub 990 (fridge, oven, cooktop, fan, dishwasher), clock 802 and appliance notification 803 informing the user that the dishwasher will be done in 5 minutes.

Figure 57:
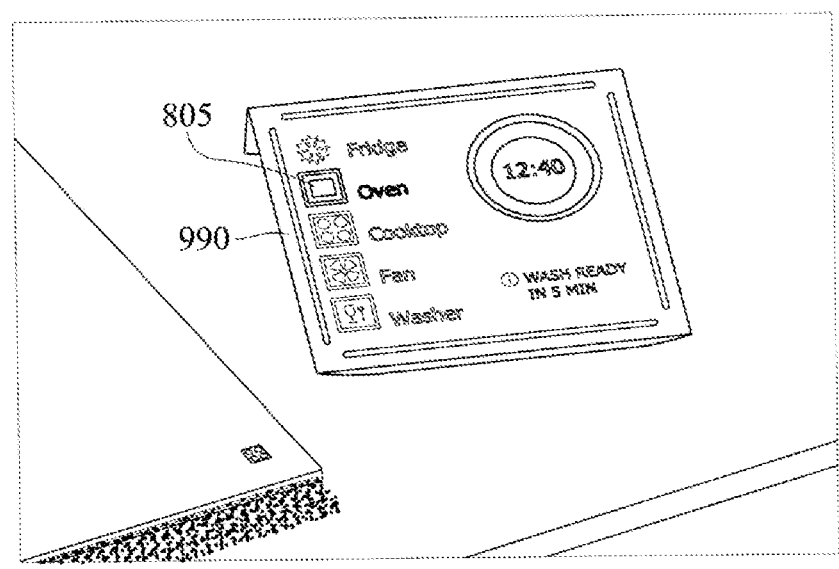
Figure 58:
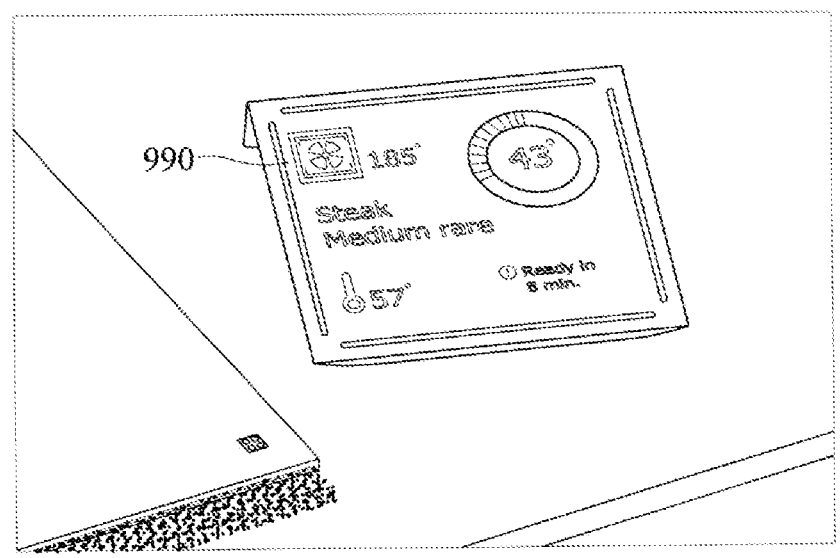

FIG. 57 shows that the oven appliance is selected on the hub screen, by a tap on oven icon 805. This selection opens the screen shown in FIG. 58 showing detailed settings and status of the oven appliance.

Figure 59:
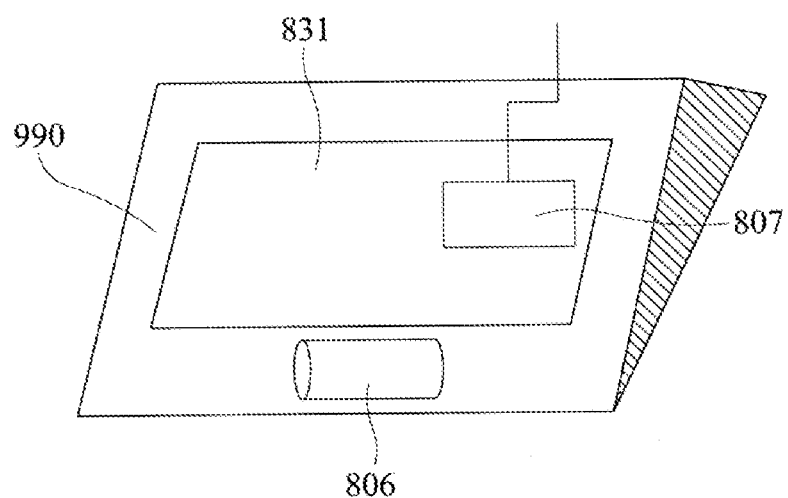
FIG. 59 is a simplified illustration of an appliance hub for controlling a plurality of kitchen appliances, in accordance with an embodiment of the present invention.

Reference is made to FIG. 59, which is a simplified illustration of an appliance hub for controlling a plurality of kitchen appliances, in accordance with an embodiment of the present invention. As shown in FIGS. 54 and 55, the appliance control hub is seamlessly inserted into a socket in a built-in kitchen appliance, e.g., oven 991, and removed therefrom. Thus, one of the appliances controlled by the hub is the built-in appliance housing the hub's socket. Shown in FIG. 59 is appliance control hub 990 having touchscreen display 831, for presenting controls for operating the plurality of appliances. Hub 990 communicates wirelessly with the appliances it controls via wireless communication circuitry 807. Rechargeable battery 806 powers the hub and is charged when coupled to an electrical outlet provided in the built-in kitchen appliance socket.

III. Dishwasher UI

Figure 60:
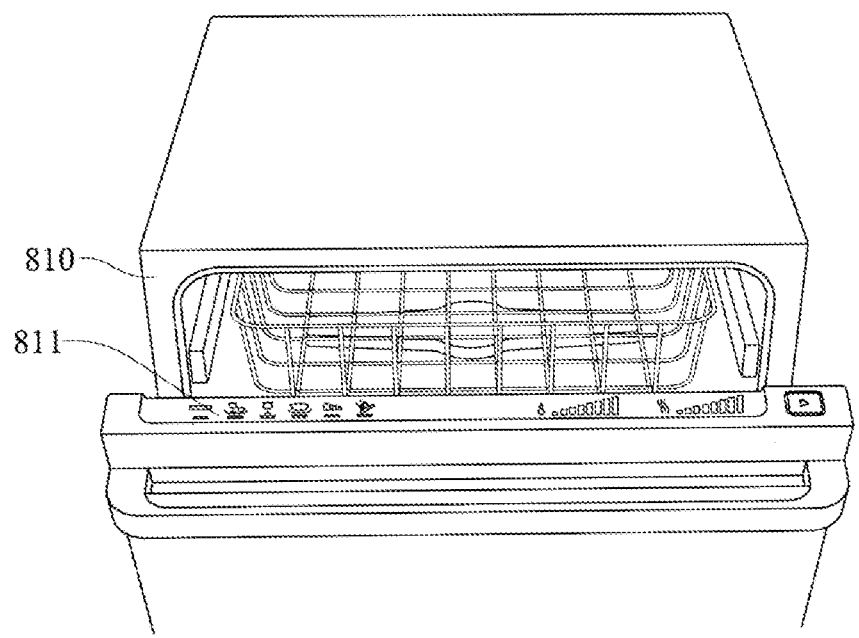
FIG. 60 is a simplified illustration of a control panel for a dishwasher, in accordance with an embodiment of the present invention.

Reference is made to FIG. 60, which is a simplified illustration of a control panel for a dishwasher, in accordance with an embodiment of the present invention. FIG. 60 shows a dishwasher 810 equipped with a touch sensitive control panel 811 utilizing proximity sensors across the top edge of the dishwasher door. This creates a smooth and easily cleaned control surface, and enables both slide gesture and touch button functionality. In some embodiments, visible-spectrum light emitters are used to provide glow indication of an active interaction area on panel 811.

IV. Refrigerator and Freezer UI

Figure 61:
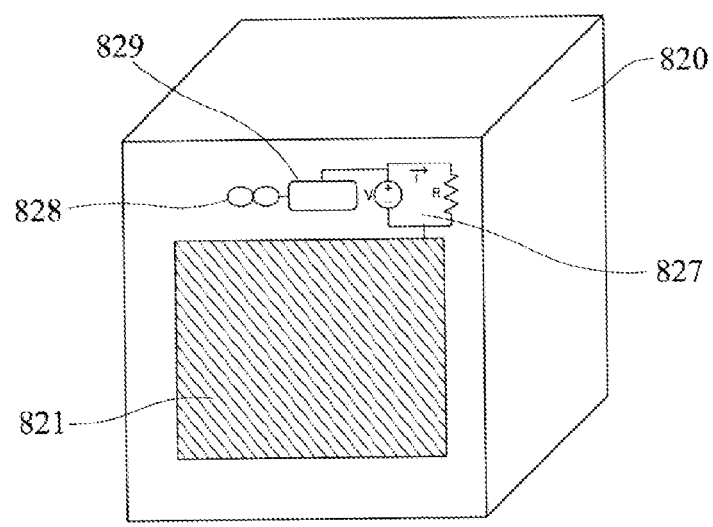
FIG. 61 is a simplified illustration of an appliance, e.g., a refrigerator, having a hollow compartment for storing items and a door that switches from an opaque state to a transparent state for viewing the stored items through the door, in accordance with an embodiment of the present invention.

Reference is made to FIG. 61, which is a simplified illustration of an appliance, e.g., a refrigerator, having a hollow compartment for storing items and a door that switches from an opaque state to a transparent state for viewing the stored items through the door, in accordance with an embodiment of the present invention. Shown in FIG. 61 is refrigerator 820 having a smart glass door 821. Smart glass is electrically switchable glass which changes light transmission properties when voltage is applied. FIG. 61 shows processor 829 connected to proximity sensor 828 and to voltage source 827. Proximity sensor 828 faces the airspace in front of refrigerator 820. When a wave gesture performed in front of the refrigerator is detected by proximity sensor 828, an indication of this detection is transmitted to processor 829 which, in response thereto, activates voltage source 827 switching glass door 821 from an opaque state to a transparent state.

Figure 62:
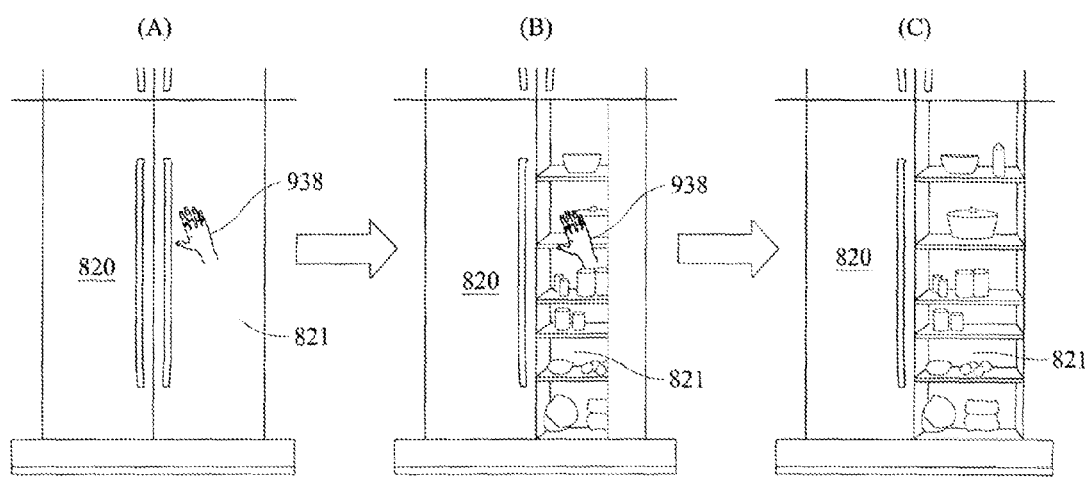
FIG. 62 is a simplified illustration of smart glass door for a refrigerator, in accordance with an embodiment of the present invention.

Reference is made to FIG. 62, which is a simplified illustration of a smart glass door for a refrigerator, in accordance with an embodiment of the present invention. FIG. 62 shows a refrigerator 820 having a smart glass door 821. The door is equipped with proximity sensors for detecting a hand-wave gesture in front of the refrigerator door. In response to this gesture, the glass door changes from opaque to transparent, providing a view of the refrigerator contents without opening the door. This feature saves energy, by avoiding unnecessary openings and reduces the time the door is kept open by a user. Thus, FIG. 62 shows (A) glass door 821 in an opaque state and hand 938 placed near door 821; (B) a wave gesture by hand 938 in front of door 821 detected by proximity sensors in door 821 activates a circuit that applies voltage to glass 821 that switches the glass from opaque to transparent; and (C) the glass is fully transparent.

Figure 63:
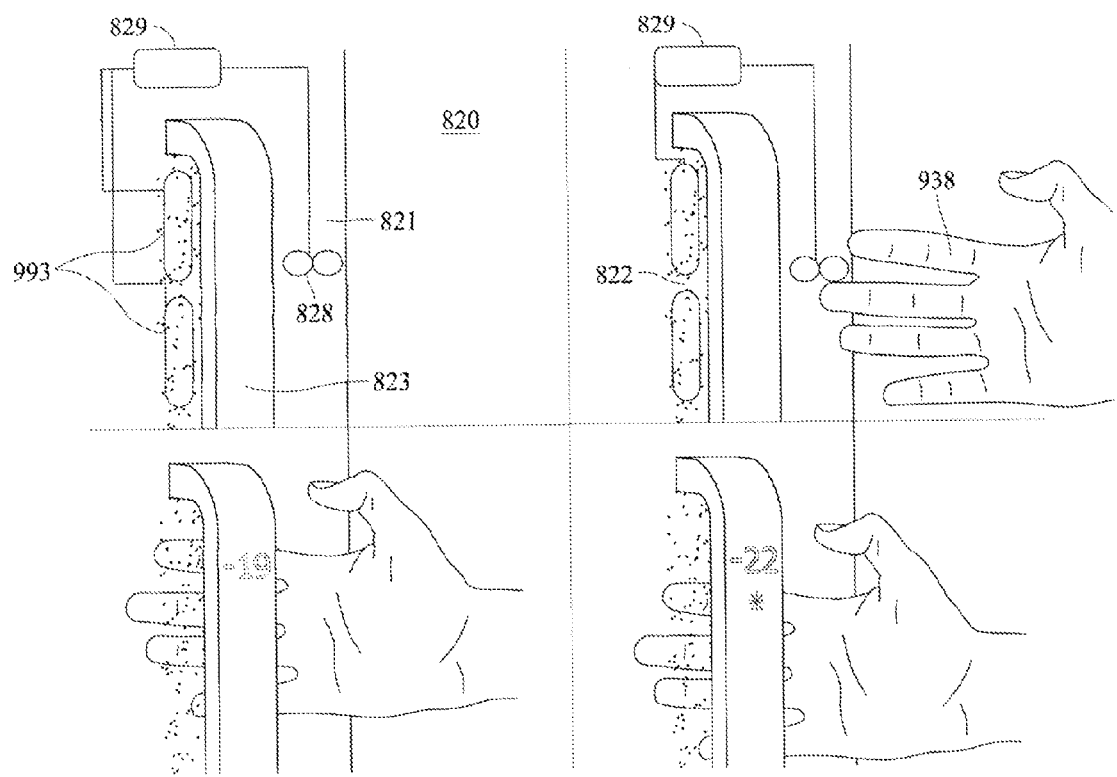
FIG. 63 is a simplified illustration of an appliance, e.g., a refrigerator, having a hollow compartment for storing items and an illuminable door handle, in accordance with an embodiment of the present invention.

Reference is made to FIG. 63, which is a simplified illustration of an appliance, e.g., a refrigerator, having a hollow compartment for storing items and an illuminable door handle, in accordance with an embodiment of the present invention. Shown in FIG. 63 is refrigerator 820 having door 821 and door handle 823. FIG. 63 shows processor 829 connected to proximity sensor 828 and to visible light sources 993. Proximity sensor 828 faces the airspace in front of door 821 near handle 823. When hand 938 approaches handle 823 it is detected by proximity sensor 828. An indication of this detection is transmitted to processor 829 which, in response thereto, activates light sources 993 illuminating the cavity behind handle 823, i.e., cavity 822.

Figure 64:
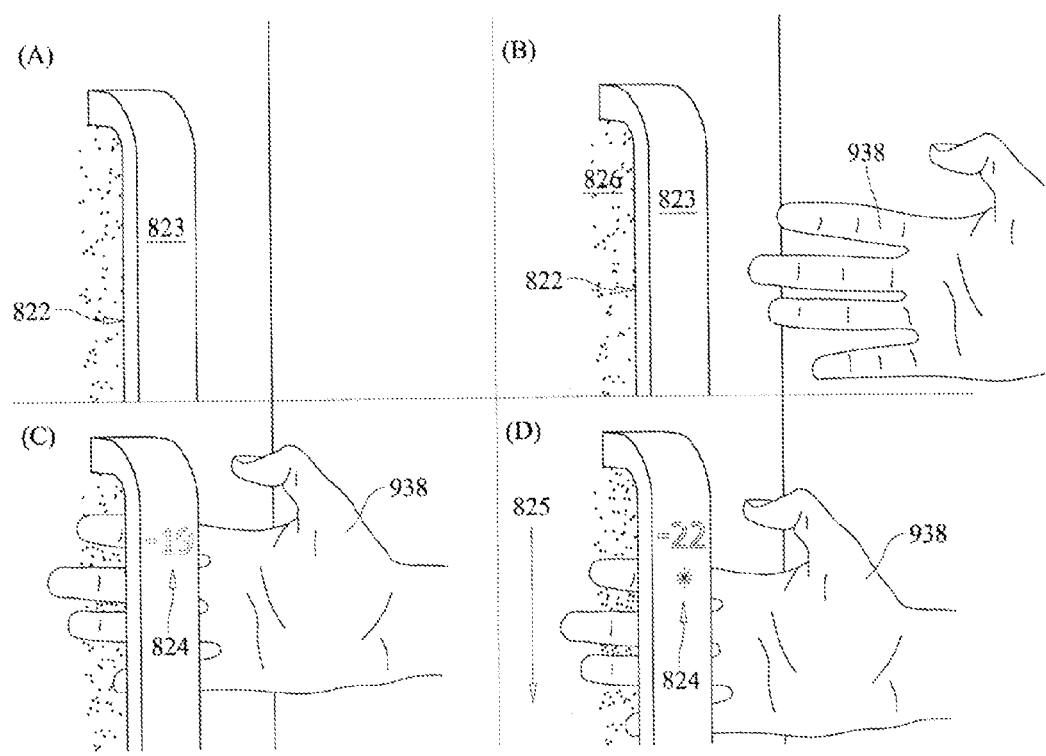
FIG. 64 is a simplified illustration of a control panel and associated user interface in a door handle of a refrigerator, in accordance with an embodiment of the present invention.

Reference is made to FIG. 64, which is a simplified illustration of a control panel and associated user interface in a door handle of a refrigerator, in accordance with an embodiment of the present invention. FIG. 64 shows a user interface for a refrigerator door handle 823. Proximity sensors on the door detect an approaching user, and additional proximity sensors on the inside of door handle 823, i.e., in cavity 822 formed between the handle and the door, detect when a user wraps his hand 938 around handle 823. Visible-spectrum light emitters are provided in the door or handle to illuminate cavity 822. (A) shows the handle before a user has approached the door. No icons are displayed on the outer surface of handle 823, and the visible-spectrum light emitters are turned off. (B) shows that when proximity sensors in the door detect an approaching user, the visible-spectrum light emitters are turned on and generate a glow 826 in handle cavity 822. (C) shows that when the user wraps his hand 938 around door handle 823 this is detected by the proximity sensors that project light into cavity 822. In response, three events occur: (i) the glow 826 in handle cavity 822 is intensified; (ii) the refrigerator temperature 824 is displayed on the outer surface of door handle 823 by an embedded display; and (iii) the refrigerator releases its inner vacuum in order to facilitate opening the refrigerator door. (D) shows that the user can adjust the refrigerator temperature by sliding his hand 938 up or down inside cavity 822. In (D) arrow 825 indicates that the user slid his hand 938 downward in cavity 822, and as a result, the displayed refrigerator temperature 824 was lowered from −19° in (C) to −22°

V. Water and Ice Dispenser UI

Figure 65:
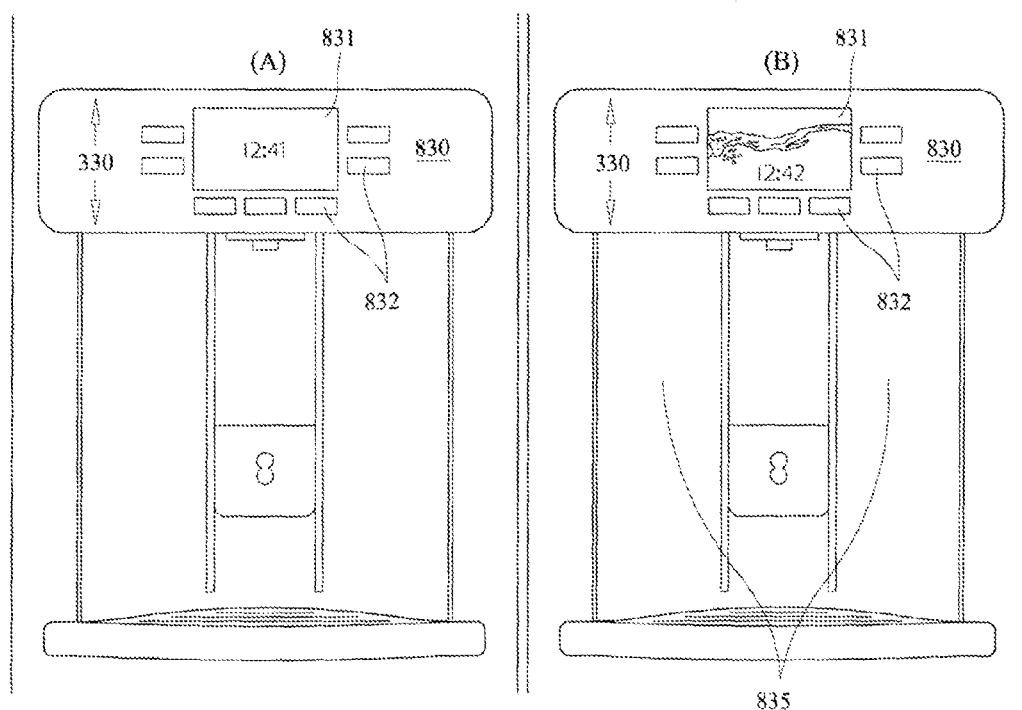
FIGS. 65-68 are simplified illustrations of user interfaces for water and ice dispensers mounted in a refrigerator door, in accordance with an embodiment of the present invention.

Reference is made to FIGS. 65-68, which are simplified illustrations of user interfaces for water and ice dispensers mounted in a refrigerator door, in accordance with an embodiment of the present invention. FIG. 65 shows a water and ice dispenser. Water and ice dispensers are often included in high-end refrigerators. The water and ice dispenser has control panel 830 that includes an embedded display 831 and touch-sensitive buttons 832. Control panel 830 is surrounded by a light guide frame 330 that is coupled with arrays of light emitters and light receivers inside the dispenser housing that project light beams across the control panel to enable touch detection at any location within frame 330. In addition, frame 330 is also coupled to light emitters and detectors that serve as proximity sensors for sensing an approaching user. Thus frame 330 projects light beams across panel 830 for touch detection, and also projects light beams outward, perpendicular to panel 330, for proximity detection.

When the proximity detectors sense an approaching user, the dispenser lights up, as illustrated in FIG. 65(B), where display 831 and dispenser shaft 835 are illuminated. Before an approaching user is detected, the dispenser display 831 is muted, and the dispenser shaft lights are turned off, as shown in FIG. 65(A).

Figure 66:
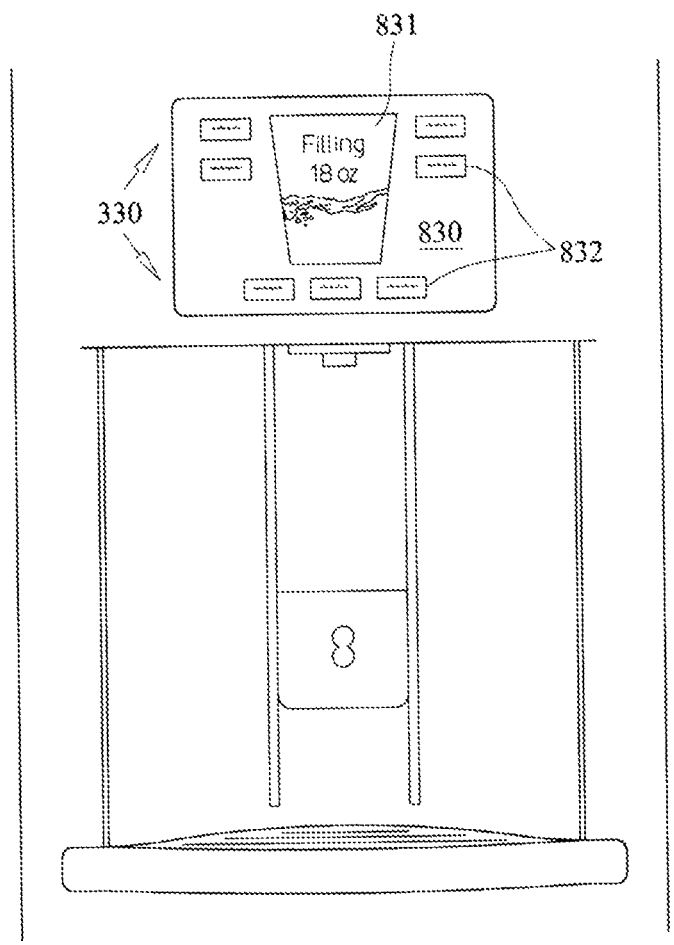
Figure 67:
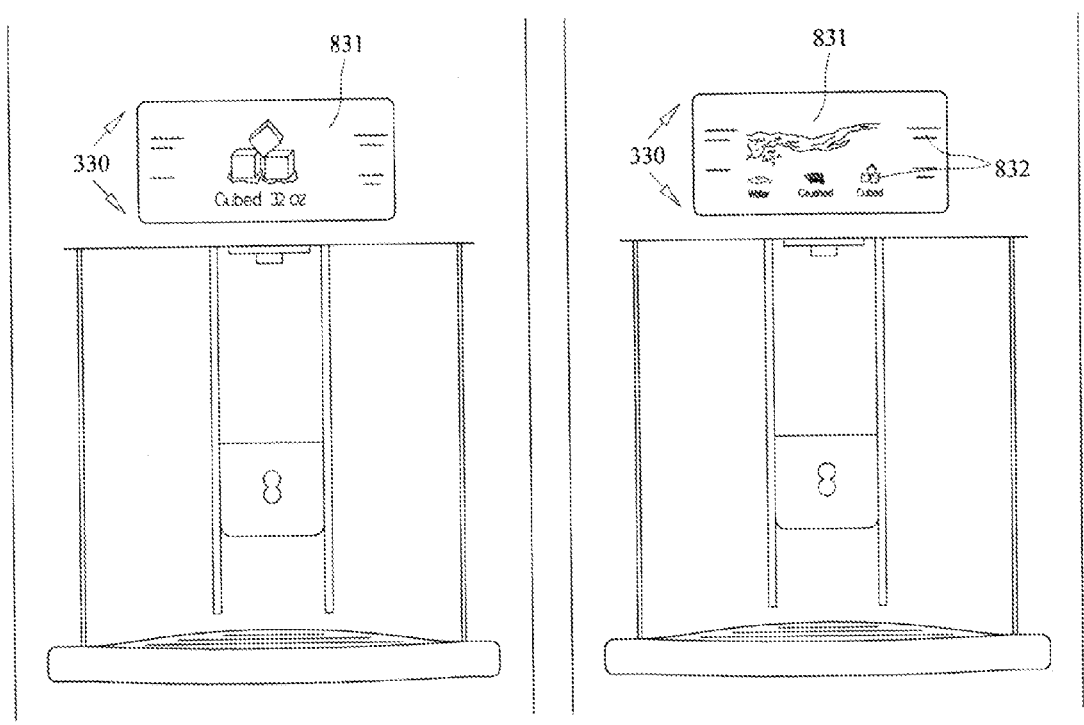
Figure 68:
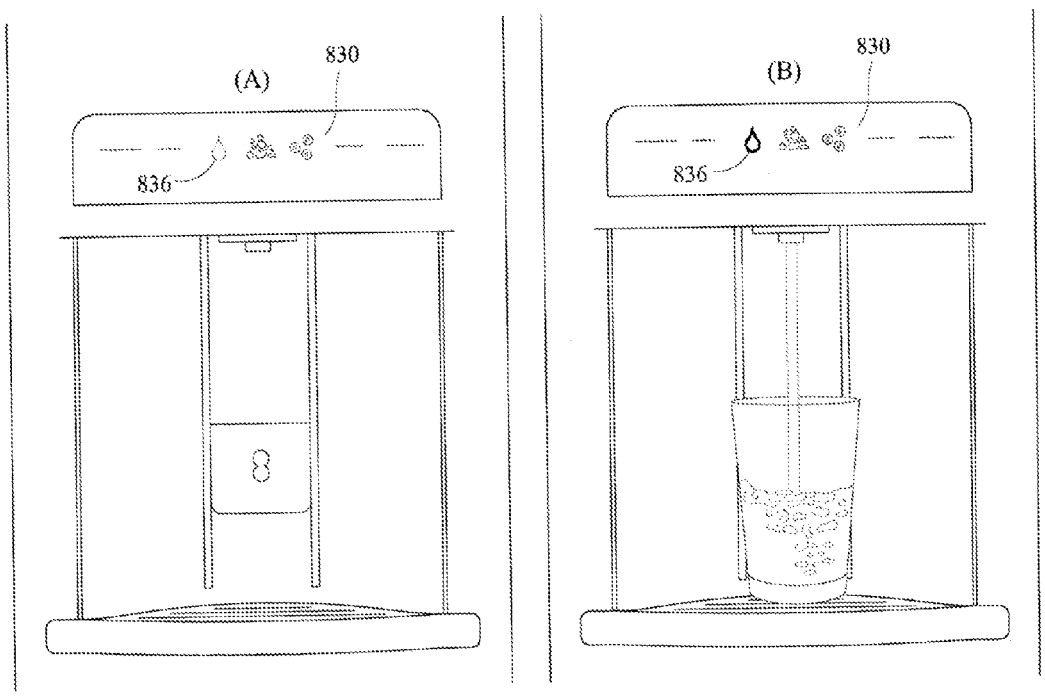

FIG. 66 shows an alternative water and ice dispenser control panel 830 with a larger display screen 831. FIG. 67 shows another alternative water and ice dispenser control panel 830 whose entire control panel is display screen 831. In FIG. 60, touch-sensitive buttons 832 are graphic icons rendered by display screen 831. Reference is made to FIG. 68 showing two views of yet another alternative water and ice dispenser control panel 830. In FIG. 68, the touch-sensitive buttons are illuminated when activated, as illustrated by button 836 which is muted in FIG. 68(A) but illuminated in FIG. 68(B) as glass 837 is filled with water.

VI. Washing Machine and Clothes Dryer UI

Figure 69:
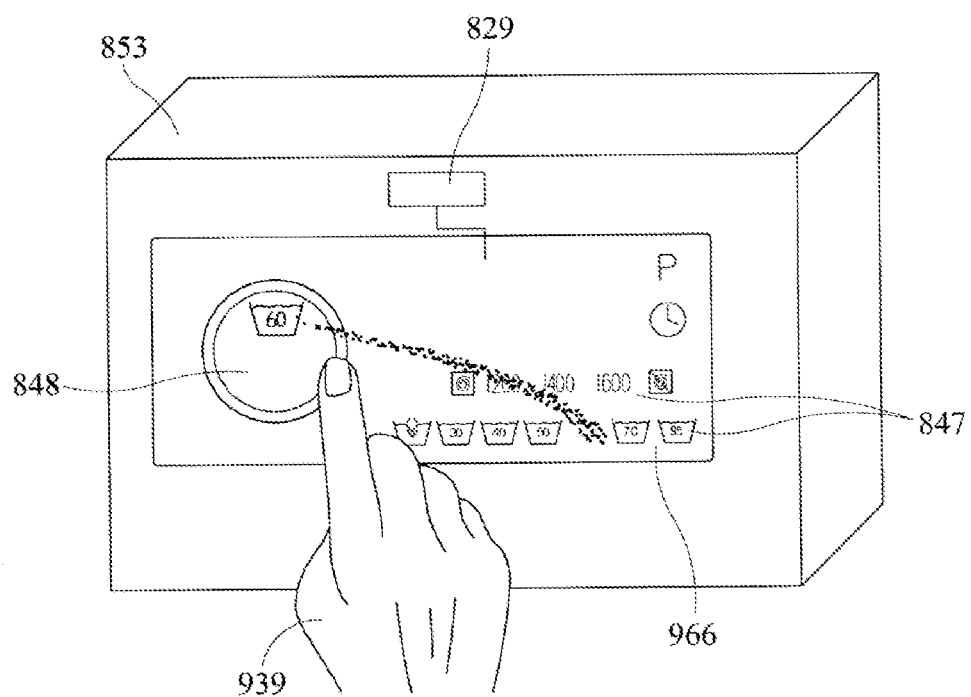
FIG. 69 is a simplified illustration of an appliance, e.g., a washing machine or dryer, having a hollow compartment for storing items such as clothes to be washed or dried and a touch sensitive panel for providing a gesture-based user interface, in accordance with an embodiment of the present invention.

Reference is made to FIG. 69, which is a simplified illustration of an appliance, e.g., a washing machine or dryer, having a hollow compartment for storing items such as clothes to be washed or dried and a touch sensitive panel for providing a gesture-based user interface, in accordance with an embodiment of the present invention. Shown in FIG. 69 is washing machine 853 having touch sensitive panel 966. Touch panel 966 presents icons 847 representing various wash settings, e.g., temperature and spin speed. Apart from icons 847, panel 966 also has a demarcated area 848. When a user performs a gesture of dragging finger 939 from one of the icons into demarcated area 848, a signal indicating the icon and the gesture are communicated to processor 829, which selects the corresponding wash setting.

Figure 70:
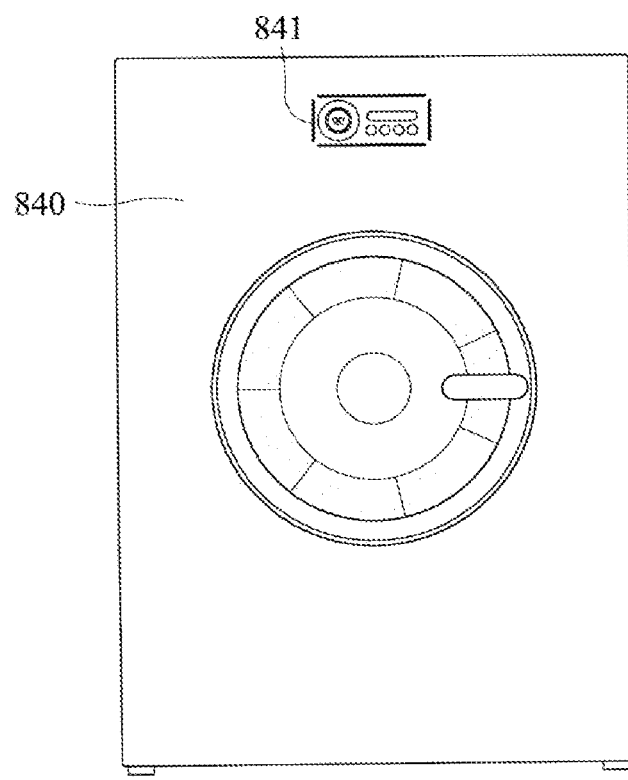
FIGS. 70 and 71 are simplified illustrations of a washing machine control panel, in accordance with an embodiment of the present invention.
Figure 71:
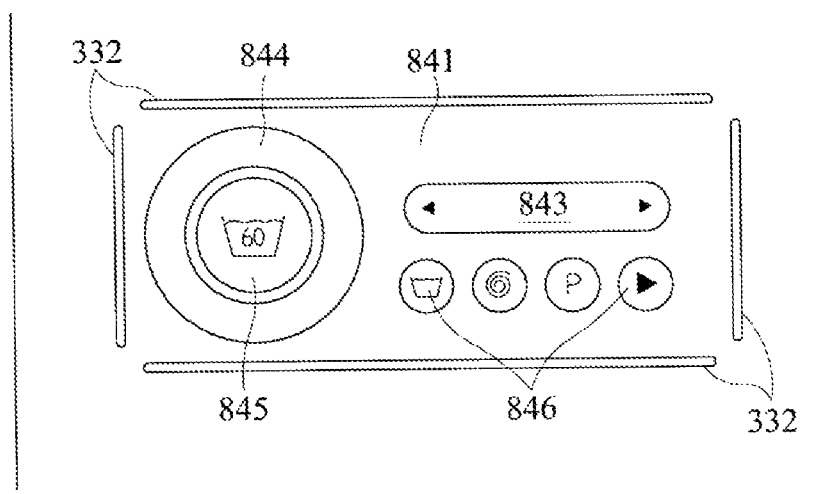

Reference is made to FIGS. 70 and 71, which are simplified illustrations of a washing machine control panel, in accordance with an embodiment of the present invention. FIG. 70 shows a frontloading washing machine 840 with control panel 841. An enlarged view of control panel 841 is shown in FIG. 71. In FIG. 71 control panel 841 is surrounded by four raised, unconnected borders 332, embossed in the washing machine housing. These raised borders are transparent to infrared light; they are light guides that direct light over and across panel 841 to enable touch detection on the panel. Light emitters and receivers are coupled to these light guides inside the washing machine housing.

Controls 843, 844 and 846 are debossed in panel 841: 846 are sunken buttons, 843 is a sunken slider groove and 844 is a sunken circular groove surrounding a small digital display 845. When a user actuates any of these controls, the actuation is detected by the light emitter-detector array coupled to raised borders 332; the sunken controls 846, 843 and 844 are formed in the housing, but have no active parts. No extra split lines or parts are needed as all input is captured by the light emitters and receivers beneath the surface. Typically, button controls 846 are used to select a mode or to start the machine and slider controls are used to adjust a value such as temperature or time. Slider controls 843 and 844 are actuated when a user glides his finger through the groove.

Figure 72:
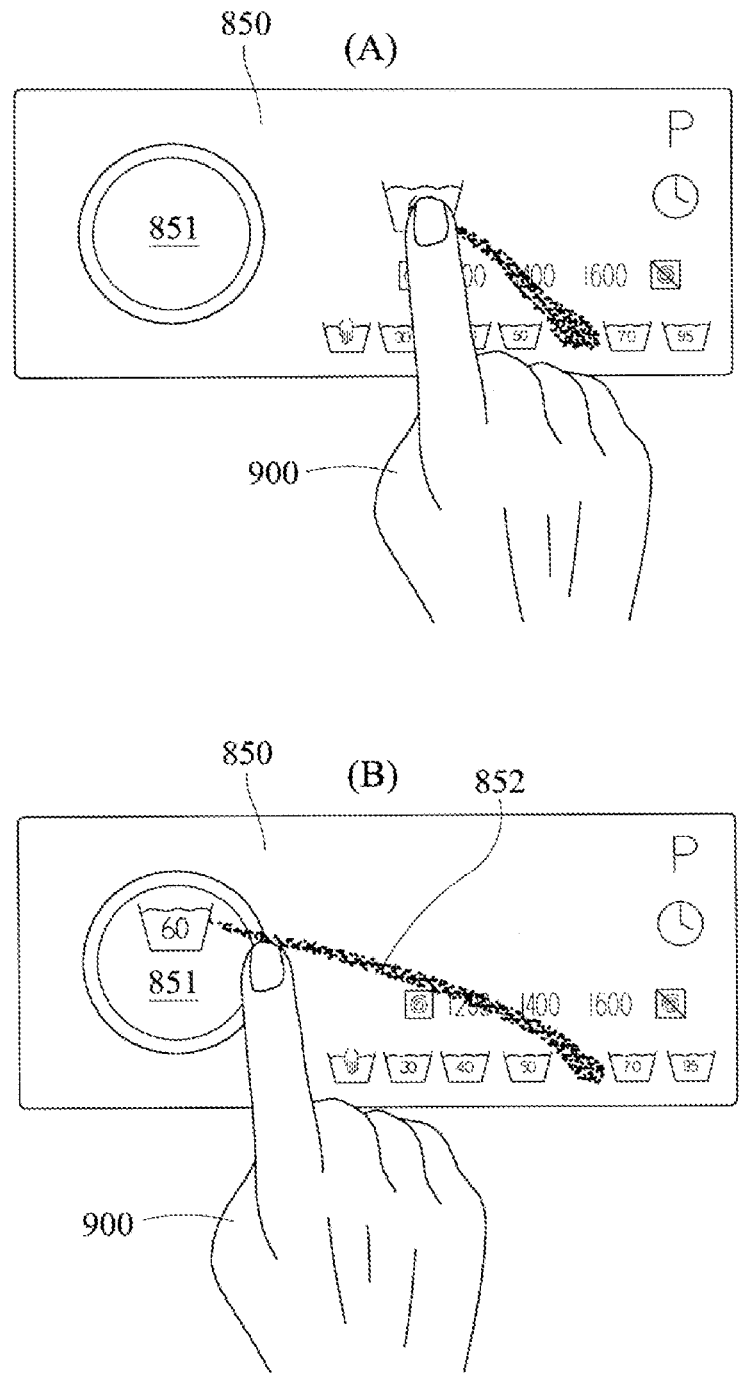
FIG. 72 is a simplified illustration of an alternative control panel and associated user interface for a washing machine, in accordance with an embodiment of the present invention; and, FIGS. 73-76 are simplified illustrations of additional control panels for frontloading and top loading washing machines, in accordance with embodiments of the present invention.

Reference is made to FIG. 72, which is a simplified illustration of an alternative control panel and associated user interface for a washing machine, in accordance with an embodiment of the present invention. FIG. 72 shows an alternative washing machine control panel UI that is modeled on an intuitive "filling the washing machine" concept. Control panel 850 displays multiple settings. To set up a wash, the user drags and drops each setting into a round recessed area 851. This avoids accidental selection, for example by a toddler or child touching the machine. Settings can be chosen in any order. FIGS. 72(A) and (B) illustrate a user dragging 852 a temperature setting into recessed area 851 using his finger 900.

Figure 73:
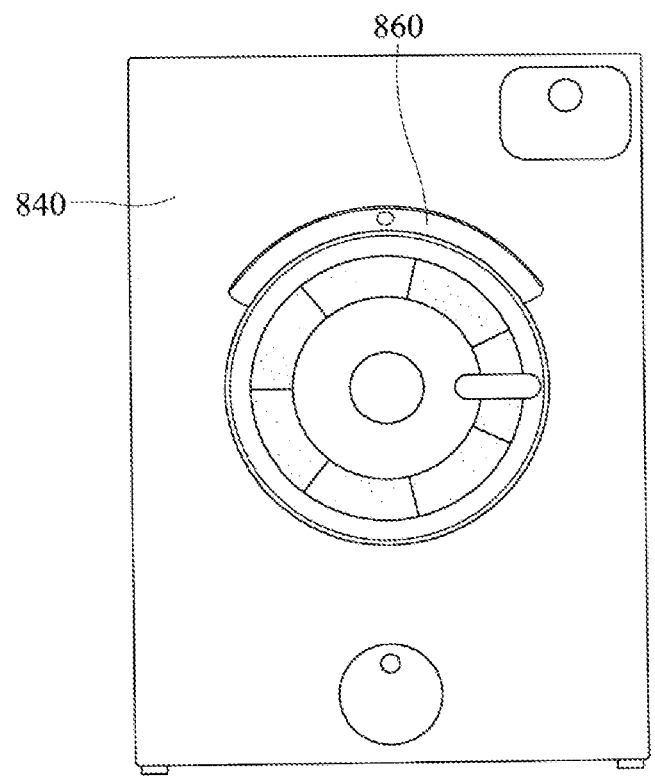
Figure 74:
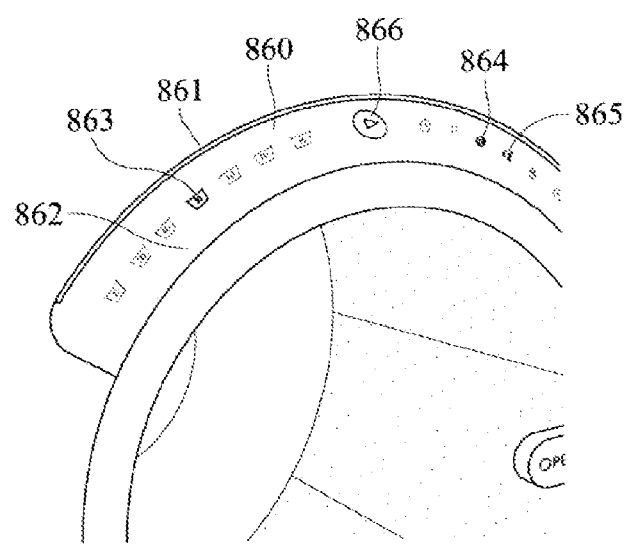

Reference is made to FIGS. 73-76, which are simplified illustrations of additional control panels for frontloading and top loading washing machines, in accordance with embodiments of the present invention. FIG. 73 shows a washing machine 840 with a control panel 860 in the form of a ribbon surrounding the frontloading door. FIG. 74 is a detailed view of control panel 860. As shown in FIG. 74, control panel 860 is an arc-shaped ribbon in which an array of tap-activatable icons are arranged along the arc. Touch detention is accomplished by an array of light emitters along the outer arc edge sending light beams across the width of panel 860 to an array of receivers along the inner arc edge. Light guide 861 is situated along the outer arc edge for guiding light from the emitters across the panel, and light guide 862 is situated along the inner arc edge for guiding the emitted light onto the receivers. These emitters and receivers are inside the washing machine housing; only a small light guide bezel from light guides 861 and 862 protrudes along the inner and outer arc edges to project the light beams over panel 860. A user touching a control blocks a corresponding light beam from reaching its receiver. Alternatively, light emitters and receivers are arranged only along the outer arc. In this case, the receivers detect light from the emitters that is reflected by a user's finger touching one of the controls on panel 860. When a user touches a control, that control illuminated. For example, FIG. 74 shows controls 863-865 illuminated. When a plurality of controls are illuminated, configuring a wash cycle, the user presses start button 866 at the top of the control panel arc to begin the wash cycle.

Figure 75:
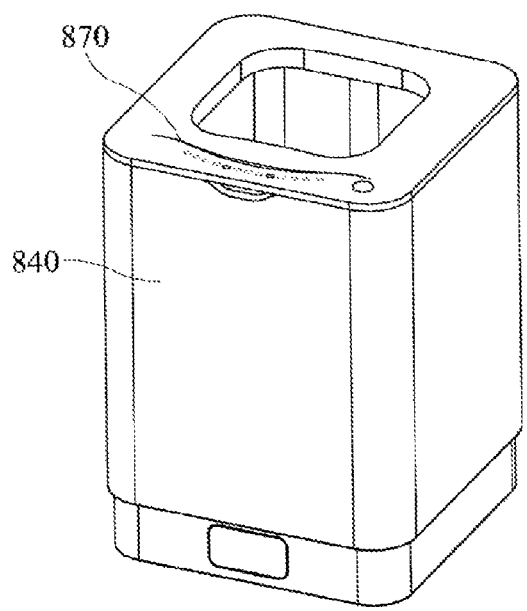
Figure 76:
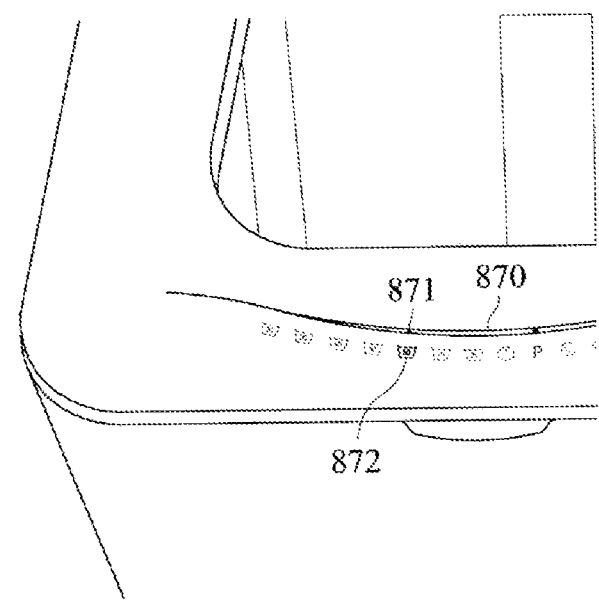

FIG. 75 shows a top loading washing machine 840 with a control panel 870 according to embodiments of the present invention. A detailed view of control panel 870 is provided in FIG. 76. As shown in FIG. 76, control panel 870 has a slightly curved array of proximity sensors 871 along a row of icon controls 872. When a user selects a control, selection is indicated either by illuminating the control or by illuminating a corresponding location on the curved proximity sensor array 871. In FIG. 76 both the selected controls and their corresponding locations on array 871 are illuminated.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification drawings are to be regarded in an illustrative rather than a restrictive sense.

What is claimed is:

1. A method for operating a stove comprising (i) a controller, (ii) a cooking surface comprising illuminable segments on outer edges of the surface, the illumination of the segments being controlled by the controller, (ii) a plurality of burners under the surface, controlled by the controller, each burner located adjacent to one or more illuminable segments associated therewith, and (iv) one or more touch-and-proximity sensors near the burners and connected to the controller, the method comprising:
   in response to the sensors detecting a pot placed above one of the burners, illuminating, by the controller, the one or more illuminable segments associated with that burner; and
   in response to the sensors detecting an object gliding along an illuminated segment:
      adjusting, by the controller, the temperature of the burner associated with that illuminated segment; and
      correspondingly changing, by the controller, the illumination of the one or more illuminated segments associated with that burner.

2. The method of claim 1, wherein said correspondingly changing the illumination of the one or more illuminated segments associated with a burner is commensurate with the amount of adjustment of that burner's temperature.

3. The method of claim 1 wherein said adjusting adjusts the temperature of the burner by an amount corresponding to the extent that the object glides along the illuminated segment.

4. The method of claim 1 further comprising, in response to the sensors detecting a person approaching the surface:
   entering, by the controller, a burner selection mode that enables selecting one of the burners; and
   illuminating, by the controller, at least one of the illuminable segments.

5. The method of claim 1 further comprising, in response to the sensors detecting a pot placed above one of the burners, entering, by the controller, a temperature selection mode that enables adjusting a temperature for a selected burner.

6. The method of claim 1 wherein the stove further comprises a plurality of visible-light emitters under the surface, controlled by the controller, independently illuminating the illuminable segments, and wherein said illuminating and said changing the illumination is performed by the controller vis-à-vis the emitters.

7. A stove comprising:
   a controller;
   a cooktop surface comprising illuminable segments on outer edges of the surface, the illumination of the segments being controlled by the controller;
   a plurality of burners under said surface, controlled by said controller, each burner located adjacent to one or more illuminable segments associated therewith;
   first and second sensors, near said burners and connected to said controller, the first sensor comprising a proximity sensor operative to detect objects on said surface, and the second sensor comprising a touch sensor operative to detect an object gliding along one of said illuminable segments,
wherein said controller is operative to:
(i) in response to said first sensor detecting a pot above a burner, illuminate the one or more illuminable segments associated with that burner, and
(ii) in response to said second sensor detecting an object gliding along an illuminated segment, adjust the temperature of the burner associated with that illuminated segment, and correspondingly change the illumination of the one or more illuminated segments associated with that burner.

8. The stove of claim 7, wherein said controller is operative, in response to said first sensor detecting the pot being lowered onto a burner, to illuminate the one or more illuminable segments associated with that burner.

9. The stove of claim 7, wherein said first and second sensors are light-based sensors.

10. The stove of claim 7 further comprising a third sensor connected to said controller, the third sensor comprising a proximity sensor operative to detect a person approaching the surface, wherein said controller is further operative to, in response to said third sensor detecting the person approaching the surface, enter a wakeup mode that enables selecting one of said burners.

11. The stove of claim 7 wherein said controller is further operative to, in response to said first sensor detecting a pot above a burner, enter a temperature selection mode that enables adjusting a temperature of a selected burner.

12. The stove of claim 7 further comprising a plurality of visible-light emitters under the surface, controlled by said controller, independently illuminating the illuminable segments, and wherein said controller illuminates the one or more illuminable segments associated with a burner, and changes the illumination of one or more illuminated segments associated with a burner, vis-à-vis said emitters.

* * * * *